(12) United States Patent
Ruffner

(10) Patent No.: US 6,338,013 B1
(45) Date of Patent: Jan. 8, 2002

(54) MULTIFUNCTIONAL MOBILE APPLIANCE

(76) Inventor: Bryan John Ruffner, 8802 Burbank Rd., Annandale, VA (US) 22003-3854

( * ) Notice: Subject to any disclaimer, the term of this patent is extended or adjusted under 35 U.S.C. 154(b) by 0 days.

(21) Appl. No.: 09/351,510

(22) Filed: Jul. 12, 1999

Related U.S. Application Data

(60) Provisional application No. 60/125,105, filed on Mar. 19, 1999.

(51) Int. Cl.[7] .......................... G06F 165/00; E21B 34/64
(52) U.S. Cl. .......................... 701/23; 342/357; 342/457; 318/581; 318/587; 340/988; 180/6.5; 180/79.1; 180/169; 180/167; 250/202
(58) Field of Search ................................. 701/200, 207, 701/213, 2, 25, 23, 24, 28; 700/245; 56/153, 10.2

(56) References Cited

U.S. PATENT DOCUMENTS

| | | | | |
|---|---|---|---|---|
| 4,777,785 A | * | 10/1988 | Rafaels | 56/10.2 |
| 4,887,415 A | * | 12/1989 | Martin | 56/10.2 |
| 5,007,234 A | * | 4/1991 | Shurman et al. | 56/10.2 |
| 5,528,888 A | * | 6/1996 | Miyamoto et al. | 56/10.2 F |
| 5,563,786 A | * | 10/1996 | Torii | 701/23 |
| 6,088,644 A | * | 7/2000 | Brandt et al. | 701/50 |
| 6,112,143 A | * | 8/2000 | Allen et al. | 701/25 |
| 6,128,574 A | * | 10/2000 | Diekhans | 701/209 |

* cited by examiner

Primary Examiner—William A. Cuchlinski, Jr.
Assistant Examiner—Tuan C To
(74) Attorney, Agent, or Firm—Diller, Ramik & Wight

(57) ABSTRACT

The invention is a multifunctional, mobile appliance capable of performing a variety of tasks safely, quietly, without pollution, and out of sight of its owner. Such tasks might include lawn mowing, fertilizing, and edging, floor vacuuming, waxing, and polishing, or rug shampooing. In its preferred implementation, the mobile unit 1 would obtain precise real time and position information using the Real Time Kinematic Global Positioning System. The user initially guides the appliance around the work-area perimeters. The device then uses this information to determine the full working area. Proximity detectors and impact sensors help the appliance avoid unexpected obstacles. The device is quiet enough to perform its task in the middle of the night while its owner is asleep, but can be programmed to work continuously or during any user-specified time interval. The small turning radius of the appliance allows it to follow intricate perimeters. In the instance of a mowing application, the cutting blades are surrounded by a cage that allows grass to enter, but excludes sticks, stones, fingers or toes. The mowing blade assembly can trim over the top of yard edging. The battery-powered device can recharge itself and a wireless link enables the appliance to communicate with its user and a user support network via the World Wide Web.

50 Claims, 12 Drawing Sheets

MULTIFUNCTIONAL MOBILE APPLIANCE

CROSS-REFERENCE TO RELATED APPLICATIONS

This application claims the benefit of U.S. Provisional Application No. 60/125,105, filed Mar. 19, 1999, and entitled Multifunctional Mobile Appliance. This application further claims the benefit of the following U.S. Disclosure Documents: No. 401088, filed Jun. 10, 1996; No. 410384, filed Jan. 3, 1997; No. 449094, filed Jan. 5, 1999.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

People who own lawns, or are tasked with maintaining them, continually struggle to keep them aesthetically trimmed. The patent record documents many attempts to simplify the task of lawn mowing, but very few innovations have had enough merit to be widely adopted. Today, lawn mowing is still largely a hot, exhausting labor that requires the use of noisy, polluting, dangerous equipment.

The members of a typical yard-owning family would be delighted to wake up each morning and find their grass precisely trimmed to a desired height without any effort on their part, with no related air or noise pollution, with no threat of injury (even to children or pets), with no need to hire mowing personnel who would invade their privacy, and even, with no visible sign of a mower. The present invention can satisfy each of these desires and do so at low cost.

The prior art illustrates a long history of attempts to automate lawn mowing. Almost all of these designs continued the mindset of mowing as a periodic process where a user brings the automatic mower into the area to be mown and returns it to storage after the mowing is completed.

One proposed method of controlling the movement of the mower (U.S. Pat. Nos. 4,347,908, Anderson; 4,831,813, Jones et al.) was to connect it to a physical track that would guide it around the lawn. Another method would use a buried wire for the same purpose (U.S. Pat. Nos. 4,180,964, Pansire; 4,919,224, Shyu et al.). Both approaches are expensive, labor intensive and disruptive to the lawn.

Other designs would require the user to start the mower in exactly the same spot each time and let a storage medium direct the mower to repeat a set of motions made during a recording run. The storage media referenced include magnetic (U.S. Pat. No. 3,789,939, Geislinger), plastic tape (U.S. Pat. Nos. 3,650,097 & 4,354,339, Nokes), or paper tape (U.S. Pat. No. 4,694,639, Chen, et al.). Each of these designs suffers from the amplification of small positional errors. Such errors may be introduced by variations in the mower's starting location and rotation, by changes in motor efficiency or by wheel slippage caused by such things as variations in grass height, moisture conditions, or temperature.

Noonan, et al., in U.S. Pat. No. 5,204,814, recognized the need to adjust for such variations. He proposed burying metal reference points at various locations along the mower path. The mower would detect these reference points as it passed and use them to correct for any deviations from its desired path. This greatly complicates the initial site preparation and the complexity of the routing algorithm. Instead of just playing back a set of wheel-drive commands recorded by the user, the invention must now know how to interpret sensor data related to the buried metal and override the command playback, The buried markers also make it difficult for the user to modify the mowing geometry after making landscaping changes.

Many of the prior-art patents depend on a pre-defined perimeter only. The perimeter may be a physical barrier, a manually mown strip, or a buried wire. The user must expend considerable effort creating any of these perimeters.

Where there is a manually mown strip, the automatic mower generally uses some form of edge detection to follow the inside edge of the mown strip. It will then spiral inward to the center of the lawn area. The edge detection method could be a mechanical arm with an electrical switch (U.S. Pat. Nos. 3,924,389, Kita; 4,184,559, Rass; 4,887,415, Martin; 5,507,137, Norris), the breaking of a light beam (U.S. Pat. Nos. 4,133,404, Griffin; 4,603,753, Yoshimura; 4,777, 785, Rafaels), or a change in motor load (U.S. Pat. Nos. 5,007,234 Shurman, et al.; 5,444,965 Colens). Manufacturers have a hard time making either the mechanical switches or the light beams rugged enough for a mowing environment. They are susceptible to bending and corrosion, clogging with plant debris and juices, and errors caused by changes in moisture content. The systems that search for increased motor loading can be misdirected by non-uniform grass growth rates and moisture content.

Many designs that incorporate a buried perimeter wire (U.S. Pat. Nos. 3,550,714, 3,570,227 & 3,698,523, Bellinger) or a fixed barrier wall (U.S. Pat. No. 5,323,593, Cline, et al.) have used a random mowing pattern. The random-walk approach will significantly extend the time required for all of the grass to be cut.

The concept of using wireless triangulation (U.S. Pat. No. 4,700,301, Dyke) for navigation has been applied to the control of farming equipment. Similarly, satellite navigation using the Global Positionng System [GPS] has been used for utility right-of-way clearing (U.S. Pat. No. 5,666,792, Mullins), rice farming (U.S. Pat. Nos. 5,438,817 & 5,606, 850, Nakamura), and the mowing of fields (U.S. Pat. No. 5,528,888, Miyamoto, et al.). For national security reasons, the accuracy of the GPS available to the public was purposefully limited to approximately 100 meters by its administrator, the United States Department of Defense (USDOD). This intentional signal corruption is known as Selective Availability (SA) [see U.S. Pat. Nos. 5,838,562, Gudat, et al., or 5,684,696, Rao, et al., for a detailed description of GPS]. Much of the introduced error can be eliminated using a technique known as differential GPS (DGPS) which compares data from the roving receiver to the same satellite data received at a known fixed location nearby, The most accurate DGPS receiver, however, still has an inherent error of considerably more than one meter and this is not sufficiently accurate for most home, yard, or industrial appliances. The term appliance, as used in this document, is inclusive of mobile machines that perform a wide range of repetitive operations or tasks over a defined work area.

Recently, the traditional concept of mowing as a periodic process has begun to yield to the idea of letting an autonomous mower continually perform the mowing task for the duration of the growing season (U.S. Pat. Nos. 5,323,593, Cline; 5,444,965 Colens). Such an approach has the advantage of further minimizing the amount of user interface required. It also enables the ideal condition of having the lawn always trimmed to the same desired height. Because the incremental amount of grass removed becomes very small, the mower is inherently mulching, so there is no need for the user to be concerned about raking or removing the cut grass. Also, a motor designed to cut off a small increment of grass can be smaller and quieter than a motor designed to wade through tall grass.

Because mowers have traditionally been dangerous appliances, one can see an obvious problem with allowing a mower to continuously mow a lawn. Many toes and fingers have been cut off inadvertently by mower users. Most prudent users would consider it unwise to allow a robotic lawnmower to wander around their lawn continually while their children and pets played in that same yard. At least two inventors have proposed the idea of using thin, razor-blade-like cutting blades that are free to rotate away if they impact something more massive than grass (U.S. Pat. Nos. 4,777, 785, Rafaels; 5,444,965 Colens), such as a human hand. While this feature might keep the blade from severing fingers, there is no questioning that a razor blade spinning at thousands of revolutions per minute will do serious damage to an errant hand or foot.

Other automated, or robotic, appliances have gone through an evolution similar to the mowers. Principal among these are floor maintenance appliances which may perform a task such as vacuuming, waxing, or polishing.

As with the mower technology, most of the floor-maintenance prior art approaches the task as a periodic one. The user brings the appliance to the work site and puts it away after the task is complete just as he would if he were performing the work manually. In one instance (U.S. Pat. No. 4,369,543, Chen, et al.), the vacuum is remote controlled by the user.

Many prior art devices have a standard appliance cord that the user must plug into an alternating-current (AC) wall socket (U.S. Pat. No. 5,621,291, Lee). In one example (U.S. Pat. No. 5,634,237, Paranjpe), the user first vacuums a room manually to program the device. The software then figures out how to repeat the process without tangling the cord given the existing set of obstacles. If the objects in the room change, or are moved, the device will need to be reprogrammed. Another device (U.S. Pat. No. 5,841,259, Kim, et al.) uses an ultrasonic sensor to avoid objects and spools out its power cable as it proceeds. It is not clear how it avoids getting the cable tangled up around the objects in the room.

One cleaning device (U.S. Pat. No. 5,537,017, Feiten, et al.), navigates by picking up its cord or a token and moving it a set distance from one side of the machine to the other as it moves from one side of the room to the other. When it reaches the far wall, it turns so that the cord or tokens are on the other side of the device and repeats the procedure in the opposite direction, gradually inching ;its way down the length of the room. While this approach might perform adequately in an open, rectangular room, it would quickly become unworkable in a typically cluttered room.

If users need to configure the device before and after each use, the amount of time saved is likely to be minimal.

Almost all of the prior art uses ultrasonic and or infrared (IR) sensors to help guide the device (U.S. Pat. Nos. 5,001,635, Yasutomi, et al.; 5,440,216, Kim; 5,568,589, Hwang) and detect potential collisions. The typical approach is for the device to traverse the length of a room (U.S. Pat. No. 5,548,511, Bancroft) or hug the perimeter (U.S. Pat. No. 5,867,800, Leif) while gathering sensor input. Using the captured data, the device calculates a path to follow to cover the entire floor surface. The path consists of a sequence of wheel rotations for a desired combination of vehicle translations and rotations. As it follows the dead-reckoned path, the device uses additional sensor data to adjust for implementation errors. This approach may work reasonably well in an open, rectangular room. Most rooms, however, are crowded with different types of furniture or are irregular in shape. Rooms often have a variety of wall coverings as well. Each of these factors changes the magnitude and direction of sonar or IR pulse reflections returning to the machine and complicates navigation. It is also not practical, in most applications, to have a dedicated machine for each room, yet it is very difficult to program these type devices to navigate from room to room.

John Evans, et al., proposed guiding the robot by analyzing images of the overhead light fixtures (U.S. Pat. No. 4,933,864). For institutions that use a standard lighting fixture, this might seem like in appealing approach, but that very regularity would make it difficult to accurately determine where in a given hallway or room the machine is located. Furthermore, the image processing would be complicated by variations in the amount of light reflected from different objects in the room and by burnt-out light bulbs. In a later patent (U.S. Pat. No. 5,051,906), the same inventors proposed adding strips of IR reflective tape to the ceiling. The robot would track its motion by shining an IR source at the ceiling and detecting the pulse of light reflected when the beam crossed the reflective tape. Bruce Field (U.S. Pat. No. 5,020,620) adopted a similar approach with reflective strips placed in front of the appliance. The value of the device to a user will decrease substantially if he needs to start making significant modifications to his environment in order to use the machine. The danger exists that the user may not make the changes correctly or that items will be moved or damaged inadvertently later by the user or by a third party.

John Wilkins (U.S. Pat. No. 4,114,711) proposed using reflective strips to correct the playing back of a recorded sequence of robot motions. This is similar to the approach, described above, of burying metal pieces in a yard to correct the playback of the path recorded for a mower (U.S. Pat. No. 5,204,814, Noonan, et al.). It has the same deficiencies.

Another invention (U.S. Pat. No. 5,165,064, Mattaboni), uses directional IR beacons mounted on the ceiling to help guide the device. Yet another makes use of bar-code scanners (U.S. Pat. No. 5,179,672, Betker, et al.). In each cage the user hag to make and maintain sophisticated modifications to the environment where the appliance will be used.

As with the mowing technology, some cleaning appliances have been designed to move randomly (U.S. Pat. Nos. 4,173,809, Ku; 5,787,545, Colens). The Ku device is simple in design, but cannot recharge itself and is unable to detect stairs or other drop-offs. Since the device follows a random path, it is likely that it would wander from the room where it was started before completing its task there. The machine might then, inadvertently, tumble down a stairway in another room damaging itself and presenting a hazard to the occupants of the building.

BRIEF SUMMARY OF THE INVENTION

The present invention is a multifunctional mobile appliance capable of discerning its position anywhere on or above the surface of the earth to a precision of several millimeters or better using the Real Time Kinematic Global Positioning System (RTK-GPS), or other similar high-precision positioning systems.

By swapping different task performing means, or work modules, onto the front of a mobile unit, the invention can perform a variety of robotic tasks, including, but not limited to, mowing, edging, fertilizing, cultivating, weeding, raking, mulching, vacuuming, sanding, polishing, shampooing, painting, or pressure washing.

In its vegetation-cutting application, the present invention cuts with revolving blades placed inside a mechanical filter structure. The structure allows vegetation to freely pass into the cutting area, but blocks larger objects such as fingers, toes, tree branches, or stones.

The present invention is quiet enough to operate in the middle of the night without disturbing residents. Therefore, it can be programmed to perform a task such as maintaining a lawn at a constant desired height without ever operating while its owner is awake or outside.

The present invention can be battery powered and is capable of recharging itself. After initially guiding the device around the desired operating perimeters, the user need have little involvement with the invention.

The present invention has an obstacle detection system that uses proximity sensors, such as ultrasonic transducers, and impact sensors to help protect the mobile unit and provide it with feedback regarding the job it is performing.

The present invention is small and nimble, allowing it to navigate regions that have narrow stretches or sharp curves that would impede traditional devices. In the illustrated embodiment, the work module extends outside of at least one wheel so that the device can easily perform its task close to walls or over edging strips. For the mowing embodiment, this will eliminate the need for manual edge trimming.

The present invention can communicate with its user through a wireless link that interfaces with the World Wide Web (WWW). In this manner, the invention can send the user email, voice mail, fax or other message formats. Messages might include a printout of a map describing the area over which work is to be performed. Other messages could include status reports or warnings regarding obstacles encountered, such a abandoned toys or fallen tree limbs. The mobile unit could automatically check on-line databases, such as those provided by the weather service, that might help it adapt its use profile to avoid impediments. The invention could periodically download software updates through this same communications link.

The user can easily modify the programmed perimeters that define the areas over which work is to be performed. The same machine can be used to perform a variety of tasks through the simple substitution of interchangeable work modules. The present invention includes appliances that have a single fixed work module as well as those that can substitute different work modules with or without assistance from the user.

BRIEF DESCRIPTION OF THE SEVERAL VIEWS OF THE DRAWING

The accompanying drawings, which are incorporated into and constitute a part of this specification, illustrate a preferred, but non-restrictive, embodiment of the invention and, together with a general description of the invention given above and the detailed description for the preferred embodiment given below, serve to explain the principals of the invention.

FIG. 13 illustrates one embodiment of a coupling mechanism for delivering electricity to the mobile portion of the invention.

DETAILED DESCRIPTION OF THE INVENTION

Mechanics

Figure 1:
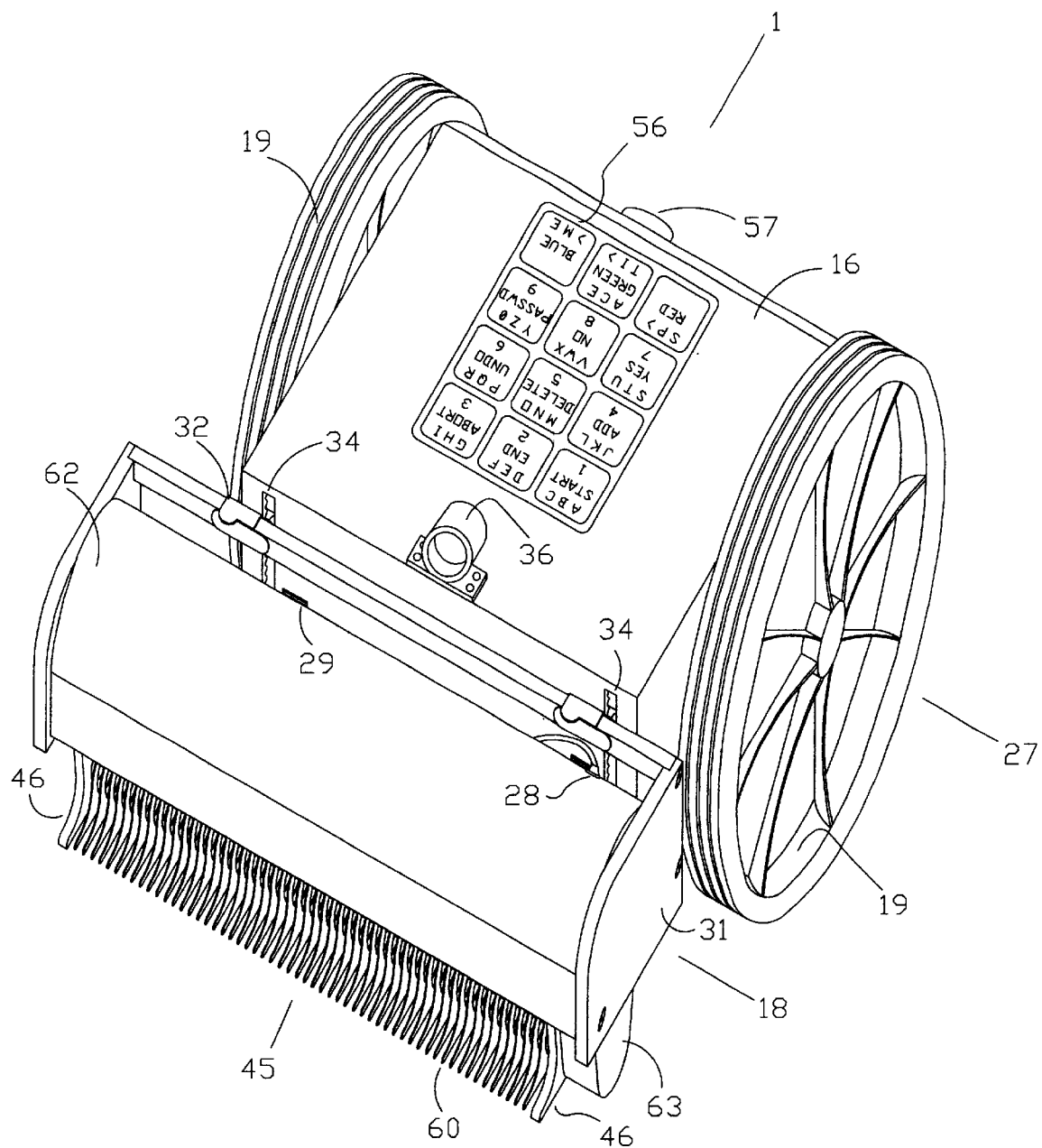
FIG. 1 is the top, front view of one embodiment of the mobile portion of the invention.
Figure 2:
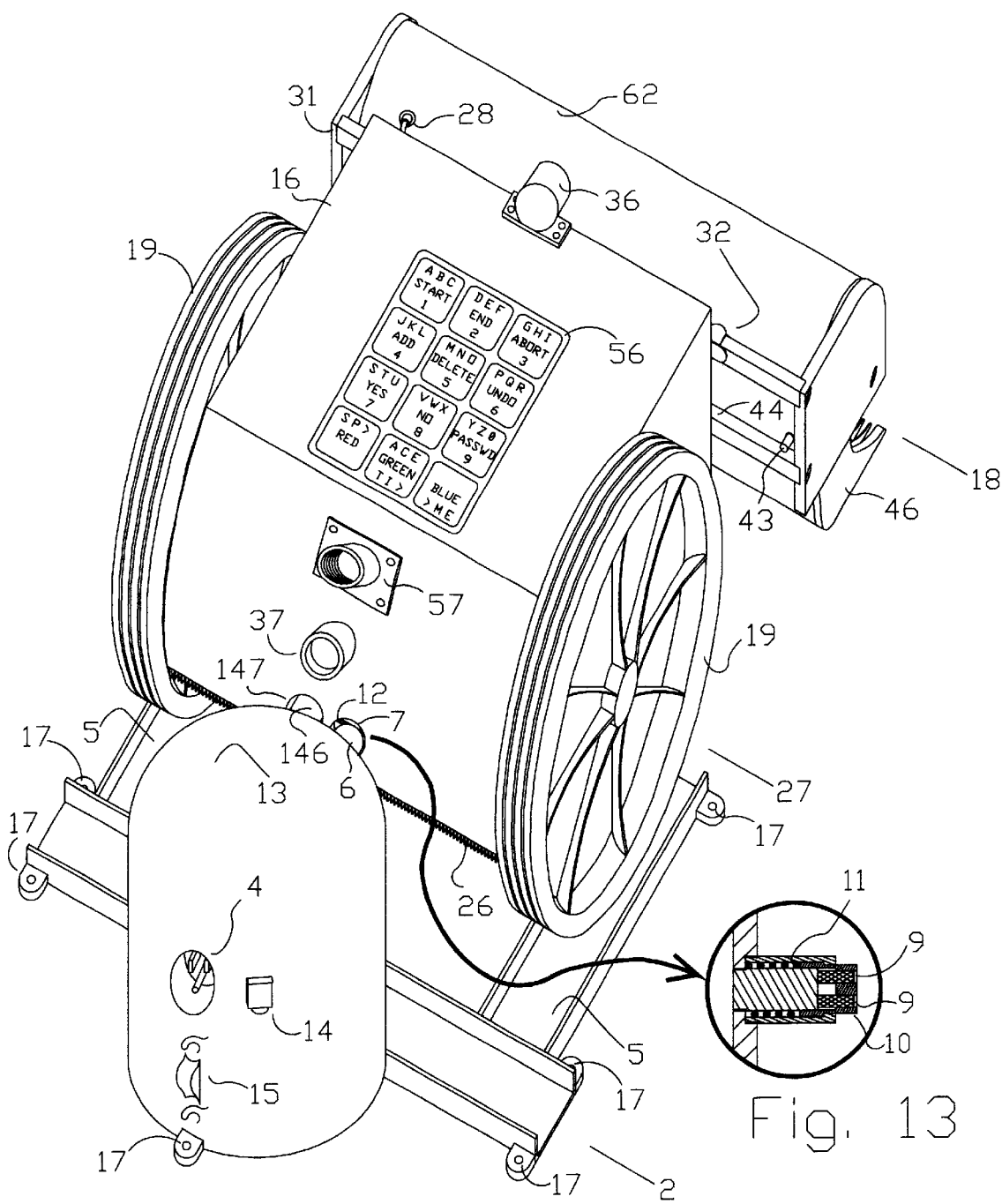
FIG. 2 is a top, rear view of the FIG. 1 embodiment, showing the mobile unit parked at a fixed station.

The embodiment of the invention disclosed in the accompanying drawings has two core elements: a mobile unit 1, shown assembled in FIG. 1, and a fixed station 2, illustrated in the foreground of FIG. 2. The principal function of the mobile unit 1 is to intelligently perform an automated task, whether that is the fertilizing, trimming or weeding of vegetation, waxing, sanding, polishing or vacuuming of a floor, shampooing of a carpet, or a variety of other tasks. The principal function of the fixed station 2 is to provide the supporting functions that enable or enhance the tasks which the mobile unit 1 is designed to perform.

Figure 3:
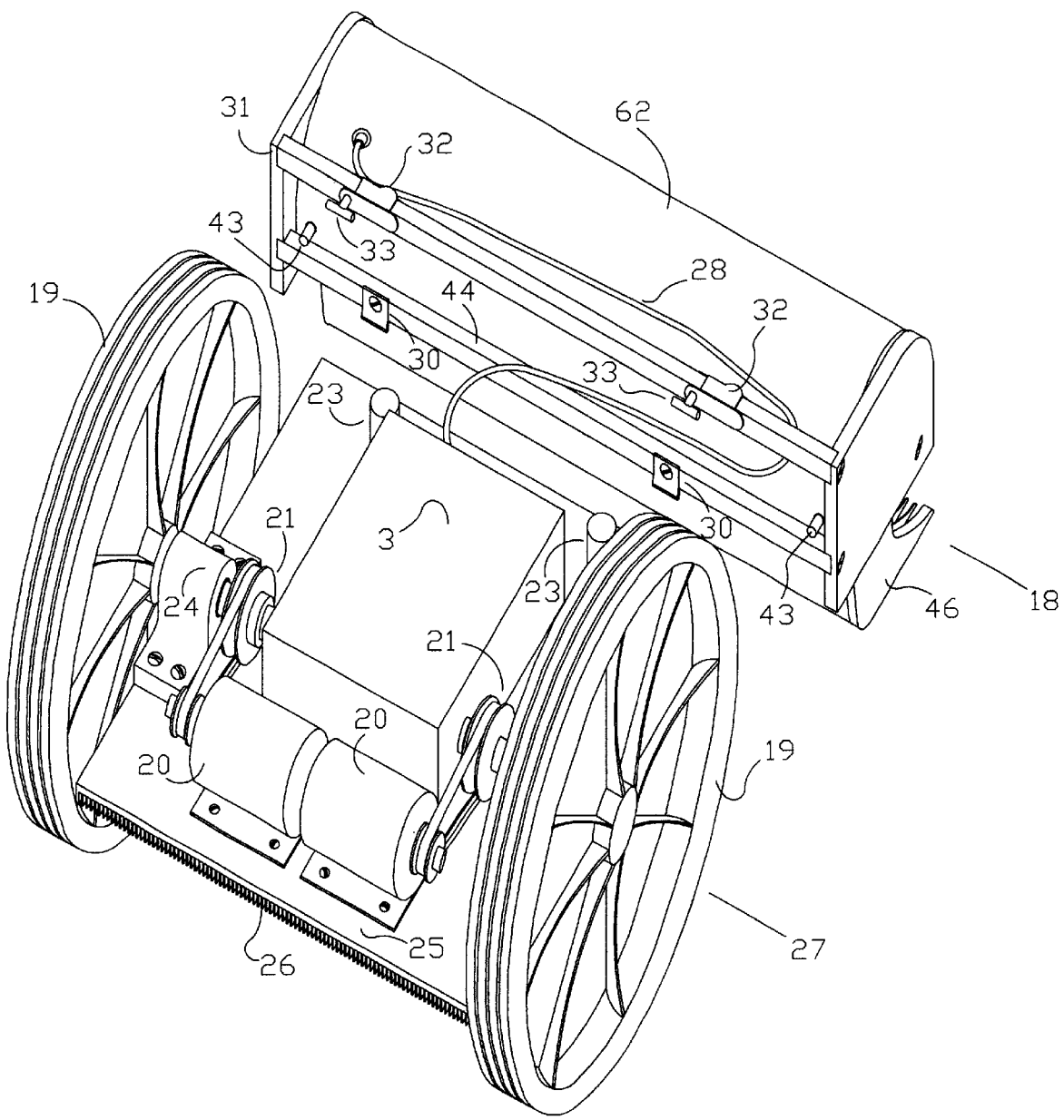
FIG. 3 shows the FIG. 2 view without the fixed station and with the carriage housing removed to illustrate components that might be mounted within.

In a preferred embodiment of the invention, the mobile unit 1 is battery powered. An example of a battery power pack 3 is illustrated in FIG. 3. The mobile unit 1 will need to be able to recharge such a power pack 3 continually, or periodically. One embodiment would use a bank of photovoltaic devices mounted on the mobile unit 1 to supply the energy for such recharging. The energy-conversion efficiency of photovoltaics, electronics, and motors would set a lower bound on the required solar-exposed surface area 16, 62 of the mobile unit 1.

For a smaller, more nimble, mobile unit 1, a preferred embodiment would have the mobile unit 1 return periodically to an energy distribution means, illustrated here as being located at the fixed station 2, for an energy transfer. One embodiment would make use of the well understood technology of inductive energy transfer. The fixed station 2 would be connected 4 to the power grid. Electronics inside the fixed station 2 would then convert the energy to a frequency that is efficient for inductive transfer and the mobile unit 1 would park underneath or adjacent to an energy-transfer paddle to receive energy.

An important aspect of this invention is the use of a high-accuracy positioning system such as the RTK-GPS, administered by the USDOD. The RTK-GPS is a dramatic improvement over traditional GPS. It incorporates carrier-phase information to improve positional accuracy by orders of magnitude, even in the presence of SA (see U.S. Pat. Nos. 5,519,620 & 5,757,646, Talbot, et al., for a RTK-GPS description). A RTK-GPS receiver can also incorporate navigational information from the equivalent Russian satellite network, known as Global Navigation Satellite Systems (GLONASS), to improve accuracy and reliability. The European Space Agency (ESA) has begun awarding contracts for the creation of a new precision satellite navigation system. There is every reason to believe that the present invention could be easily modified to incorporate information from such new positioning systems to enhance the precision and robustness of the mobile unit's 1 navigation software.

The mobile unit 1 and the fixed station 2 will know their relative locations very accurately. Therefore, a simpler alternative to the inductive charging system described above might be a direct conductive linkage as illustrated in FIG. 2. In this embodiment, the mobile unit 1 would back onto a track 5 that is part of the fixed station 2, thus ensuring the proper coupling elevation. A probe 6 on the fixed station 2 would mate with a corresponding socket 7 located on the mobile unit 1. One possible mechanical implementation of such a coupling probe 6 is illustrated in FIG. 13. This enlarged view shows a cross section of the probe 6 viewed from the top and sectioned in the middle. Electrical contacts 9 are protected from the environment by a cover 10 that is pushed out past the end of the electrical contacts 9 by a spring 11. When the mobile unit 1 backs into the probe 6, it pushes back the cover 10 allowing the electrical contacts 9 to emerge and mate with matching connectors 12 inside the mobile unit's 1 power socket 7. A variety of coupling mechanisms could accomplish the same goal.

To obtain the best accuracy from any of the satellite positioning systems, the invention would incorporate a fixed or base receiver to work with the mobile or rover receiver. The fixed receiver, whose position is known, acts as a local reference that helps the mobile receiver eliminate positional errors introduced by environmental noise as well as SA noise purposely introduced for security reasons by the USDOD. The United States government has announced that it intends to eliminate SA in the near future. The illustrated embodiment of the invention has a fixed receiver located under the protective dome 13 of the fixed station 2. Other embodiments might incorporate fixed receivers that service a collection of mobile units 1. For instance, in certain locales, a DGPS is currently implemented by placing a fixed receiver at a local radio or television station and broadcasting the differential information to mobile receivers. The United States Coast Guard has also placed a network of reference or base receivers for DGPS applications along the United States coastline on existing direction-finding beacons. Finally, the United States Federal Aviation Authority (USFAA) is implementing a continental-wide DGPS called the Wide Area Augmentation System (WAAS) and a Local Area Augmentation System (LAAS) for accurately guiding planes during landings. These systems are, or will be, freely available for other commercial applications. While the DGPS is not as accurate as the RTK-GPS, a similar approach could be used for the RTK-GPS. In any differential system, the ability of the reference receiver to correct errors decreases as the distance between the reference receiver and the mobile receiver increases. The optimal differential system would, therefore, have a dedicated reference receiver for each mobile unit 1, placed as close as possible to that unit. The limiting factor for practical application is cost, but the cost for the associated electronics is falling rapidly.

The fixed receiver can improve the accuracy of the motion of the mobile unit 1 by sending the mobile unit 1 the error-correction information it calculates. The most effective means for transferring this data is through a wireless link. One embodiment, as described above, might be to transmit that information from a local radio station, Coast Guard beacon, or USFAA transmitter to a wide area. Another embodiment would use the cellular radio infrastructure to broadcast error-correction data. A further embodiment would send the information over phone or cable TV wires in combination with a short-distance wireless link. The illustrated embodiment incorporates a short-distance, spread-spectrum or frequency-hopping transceiver. Many independent transceivers could operate in a common area because of the broadband signal transmitted. The transceivers could encode the transmitted data to further eliminate cross talk between unrelated transceiver pairs.

In the illustrated embodiment the GPS and transceiver antennas are integrated with their respective electronics and protected behind the fixed station 2 and mobile unit 1 housings (13 & 16 respectively). Another embodiment could use a more traditional external antenna mounted on the outside of the housings.

The effectiveness of the mobile unit 1 can be enhanced by enabling it to send information to the fixed station 2. The fixed station 2 is shown having a weather-resistant phone jack 14 connecting it to the local phone network. Other embodiments might have the fixed station 2 equipped with a connector for a coax or fiber-optic cable. The wireless to land-line interface does not need to be grouped together with the other functions shown as part of the fixed station 2. It might be, instead, handled at a remote central-processing station. In each case, the utility connection, in combination with the transceiver set, enables the mobile unit 1 to have full access to a variety of communications media, including the WWW. The illustrated embodiment also has a strain-relief fitting 15 to help keep the phone and power cables secure against vibration or cable movement.

The combined wireless and land line communications link described above permits the mobile unit 1 to communicate with the user via numerous communication utilities, including voice mail, faxes, email, and web pages. For instance, the mobile unit 1 could send the user a plot showing the outlines of the areas being mown, vacuumed, etc. (see FIG. 10). It could send status reports to the user indicating progress made or requesting assistance in the event of difficulty. After a storm, for example, a mobile unit 1 with a mower work module 18 installed, might encounter fallen tree limbs in a yard. The user could be alerted to this hazard by the mobile unit 1 through these communications media. The invention could disable itself and alert the user of its own theft since it would be able to sense its forced removal from a given geographic location. The mobile unit 1 might also communicate with the user through a customer-service data base on the WWW. Thus, even if a thief were able to block the communications link, the data base would still be able to report the theft to the user due to the absence of regular communication with the device. In addition, the invention could update its software routinely, using its connection to the WWW. It could search online databases for pertinent information. For a mobile unit 1 used outdoors, such information might include weather forecasts. For a mobile unit 1 used for an indoor, industrial application, such information might include company work schedules, area access codes or active coordination with other mobile units 1.

The fixed station 2, illustrated in FIG. 2, is designed for an outdoor application. The user stakes the fixed station 2 into the earth using the mounting holes 17. A similar fixed station 2 could be used for an interior application, with the stakes replaced with screws, nails, or adhesive.

The mobile unit 1 could perform many tasks more efficiently if it had the ability to pick up materials or dispose of waste products. Examples of source materials might include, among others, fertilizer, water, seed, or insecticide for lawn care, protective coatings, detergent, or abrasive particles for floor care. Similarly, examples of waste materials might include water, dust, clippings, absorbents, and the residue from applied materials, To facilitate the addition of materials to and the removal of wastes from the mobile unit 1, the embodiment illustrated in FIG. 2 includes a socket 147 on the mobile unit 1 that engages a mating nozzle 146 on the fixed station 2. For simplicity the illustrated embodiment uses a common nozzle for both material dispensing and waste collection. The invention could just as easily contain separate nozzles for these tasks. The illustrated embodiment shows a variety of mobile unit 1 support functions being provided at the fixed station 2. Such functions might include material dispensing, waste collection, energy distribution, communications, and the provision of a navigational reference. They are illustrated in this fashion for simplicity. There is no requirement that these functions be placed together at the same site nor that they necessarily be fixed in location.

Figure 7:
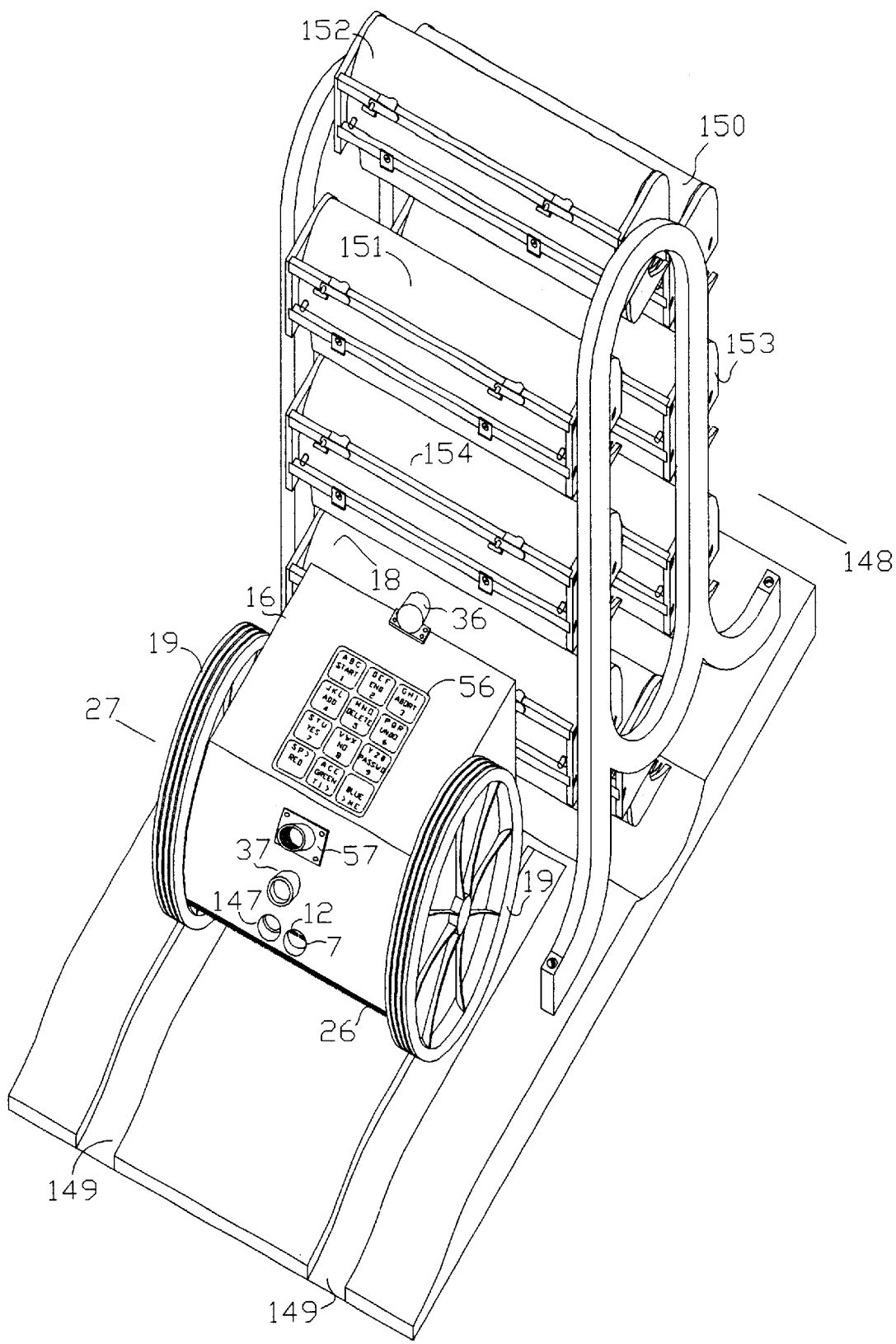
FIG. 7 illustrates a work module distribution means whereby the mobile unit can automatically interchange different types of work modules for a variety of tasks without user assistance.

In another multifunctional embodiment, the task-performing means would be automatically detachable. FIG. 7 illustrates one means for distributing different work modules 18 to a mobile unit 1. A collection of work modules 18, 150–154 is shown suspended from two tracks to create a vertical carrousel. The mobile unit 1 would approach the work module distribution means 148 and direct it to queue up an empty slot to accept the work module 18 that is presently attached to the mobile unit 1. A ramp 149 ensures that the elevation of the mobile unit 1 matches that of the distribution means 148. The mobile unit 1 would then direct the distribution means 148 to position the desired next work module 150 which could be any of the available modules. The mobile unit 1 could control the distribution means 148 through a variety of mechanisms, including a direct wireless connection, a direct conductive coupling, or communication through the World Wide Web via the fixed station 2. As an example, the mobile unit 1, after mowing, could swap a mower work module 18 with a fertilizing work module 151. Likewise, while performing the task of refinishing a floor, the mobile unit 1 could exchange sanding 152, waxing 153, and polishing 154 work modules.

The productivity gains provided by the flexible use of a variety of different work modules 18 could be enhanced through interaction with support facilities provided over the WWW. Regarding lawn care, for instance, a support utility could process local information about rainfall and temperature, deciduous conditions, hours of sunlight, soil condition, and even preprogrammed information regarding the vegetation present in different portions of the work areas. The support utility could use this information to direct a given mobile unit 1 over the course of a year to perform tasks like fertilizing, watering, mowing, mulching, aerating, or applying pesticides in a safe, appropriate and timely fashion. This same customization would work well for a variety of other tasks, both indoor and outdoor.

The GPS was not designed to function indoors. Building structures hamper receiver effectiveness, by attenuating and reflecting the transmitted satellite signals. Signals that reach the receiver through any path other than a straight line from the transmitting satellite are referred to as multipath. Multipath will degrade the accuracy of traditional GPS receivers. Automatic gain control (AGC) circuitry, choke ring antennas, and advanced digital signal processing (DSP) algorithms are examples of circuitry and techniques that this invention can use to enable the RTK-GPS to function properly indoors. The mobile unit 1 could also use data from inertial navigation 145 to help it filter out multipath. The received line-of-sight satellite signals should be the ones that most closely match the location calculated by inertial navigation. Recent advances in silicon microelectromechanical systems (MEMS) have dramatically reduced the cost of inertial navigation components such as sensitive accelerometers and angular rate sensors. Other inertial navigation components include gyroscopes and magnetometers. These components could be used in combination with the wheel rotation encoders to provide very accurate information regarding where the mobile unit 1 is located relative to a fixed station 2.

The mobile unit 1 has two principal components: the carriage 27 and the work module 18. In the illustrated embodiment, the carriage 27 includes the motor functions, the navigation electronics, the power supply and energy storage, and the user interface circuitry. The work module 18 is a means for performing a particular task. For the embodiment illustrated, the work module 18 is designed for mowing and trimming. As described above, other work modules 18 might include, among other tasks, tools for spreading fertilizer, raking and mulching leaves, cultivating gardens or crops, painting or sealing surfaces, vacuuming or shampooing rugs, sanding or polishing floors.

FIG. 3 shows the carriage 27 with its housing 16 removed. The embodiment illustrated has two large wheels 19, driven by separate motors 20, coupled through transmissions 21. Stepper motors are a logical choice for the motors because of their simple interface to digital controllers. Since they rotate in discrete angular steps, they lend themselves well to positioning applications, such as this one. The transmission 21 illustrated is a belt drive for simplicity and to permit slippage in the event of a torque overload. Another embodiment could just as easily use a gear set because the motor itself will slip in the event of a torque overload. This embodiment would include a rotation sensor 71, which might be a Hall effect or optical switch, or a magnetic or optical encoder. The sensors will enable the mobile unit 1 to verify rotation and detect slippage. The transmission 21 enables the optimization of motor torque and rotational speed in order to obtain the best performance from the smallest and least-expensive motors. In yet another embodiment, the wheels 19 could be directly driven by the motors 20 and the transmissions 21 could be eliminated.

The illustrated pillow blocks 24 provide the bearing surface between the wheel axles, the motor platform 25, and the motor transmissions 21. They also help block environmental contaminants from entering the mobile unit 1. Other embodiments could include a wide range of mechanical drive-wheel interfaces.

Inexpensive motor-drive electronics have enlarged the motor 20 options. In addition to stepper motors, almost any other type of motor could work, including brushless DC, AC induction, servo, etc. The ideal motor may vary depending on the work module 18 used and the price trade-off between the motors 20 and their drive electronics.

The illustrated motors 20 could be cooled with integral fans. For applications such as the mower or fertilizer, where the invention will be permanently stationed outdoors, this could complicate the effort to seal out environmental contaminants and attenuate acoustic emissions. In the illustrated embodiment, therefore, the motors 20 are cooled through conduction. They are shown mounted on a metal base 25 with heat fins 26 to wick away the motor heat. A preferred embodiment would line the inside of the mobile unit 1 housings 16, 62 with sound-dampening material. A preferred embodiment would also include metal shielding around those components generating electromagnetic interference (EMI) to improve the performance of the on-board electronics and conform with government EMI emission regulations.

The drive wheels 19 in this embodiment are separately driven and can rotate in opposite directions. This allows the mobile unit 1 to follow intricate patterns and make turns with close to a zero turning radius. In another embodiment, a single, more powerful motor 26 combined with a more complicated transmission system 21 could be used to accomplish a similar objective.

Figure 5:
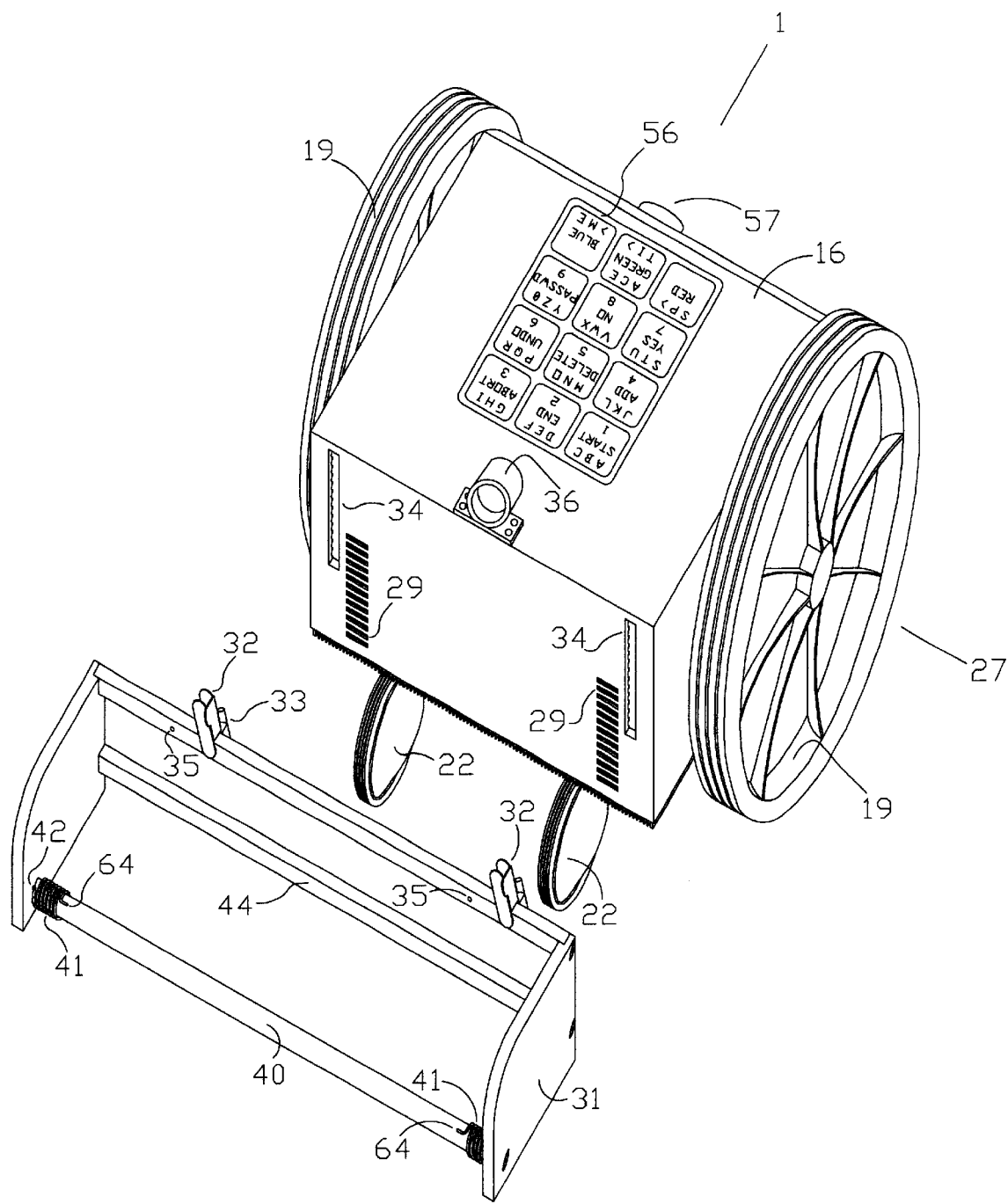
FIG. 5 shows the FIG. 4 view with additional components removed to reveal the module mounting bracket, shown detached from the carriage housing.

The carriage 27 of the mobile unit 1 depicted in this embodiment has pivoting castor wheels 22 (see FIG. 5) to provide stability and help keep the work modules 18 a constant distance from the floor or ground during grade changes. FIG. 3 illustrates sockets 23 for two such castor wheels 22.

Figure 4:
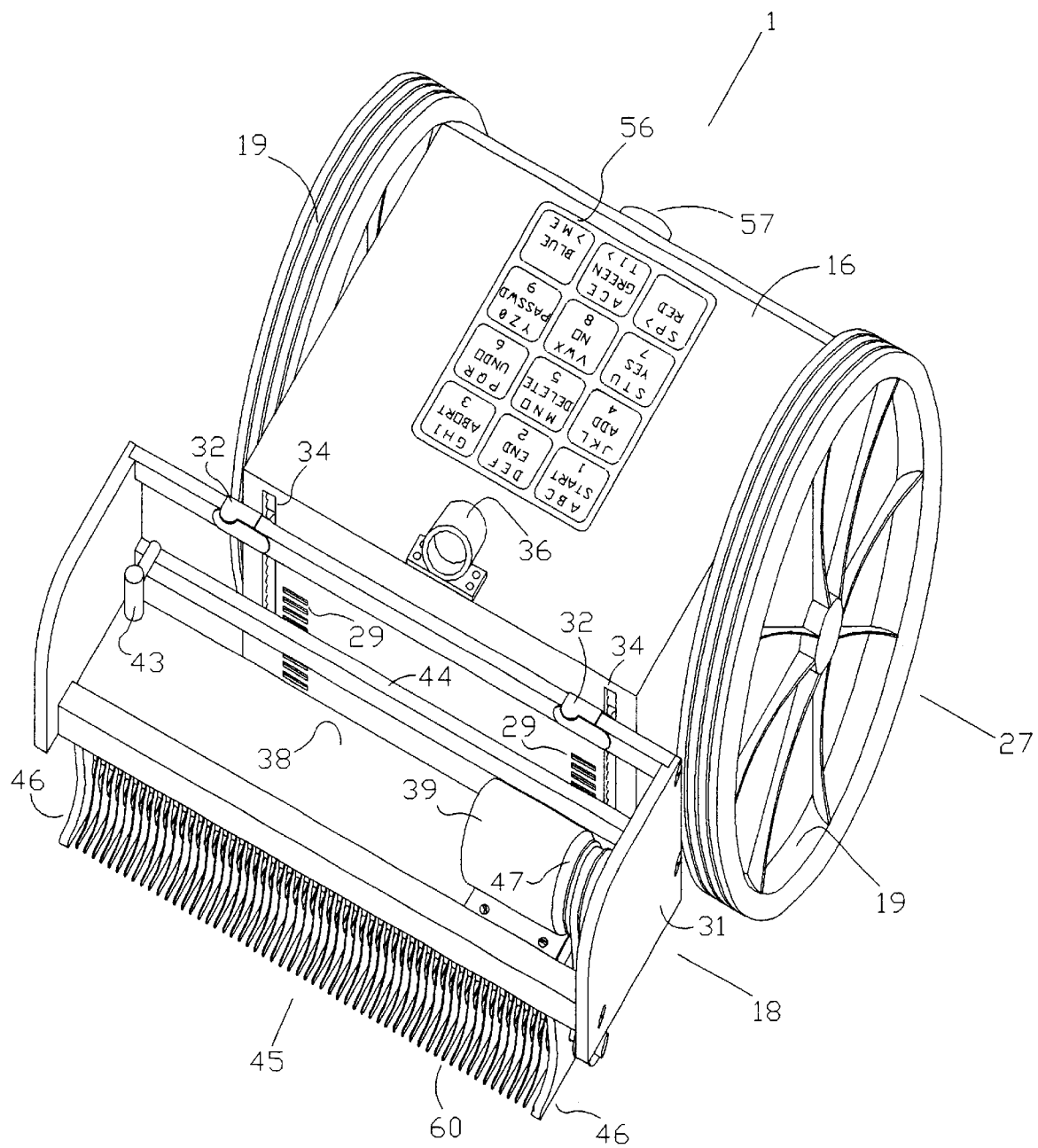
FIG. 4 illustrates the FIG. 1 view with the work-module housing removed.

A vegetation-trimming work module 18 is shown attached to the front of the carriage 27 in FIG. 1. The illustrated work module 18 is permanently linked to the carriage 27 though an electrical cable 28. For applications where the carriage 27 will be used with a variety of work modules 18, the electrical cable 28 could be replaced with a quick-disconnect connector that might be electro-mechanically actuated. FIGS. 3 & 4 illustrate how the elevation of the attached module can be adjusted accurately and easily. While the illustrated work module 18 does not need electronics in the module itself, the carriage 27 will be better able to accommodate a multitude of work modules 18 if such modules also include electronic circuitry specific to the task they are designed to perform. The electronics in the module could communicate with the electronics in the carriage 28 over the same electrical cable 28 with which it receives its power. The work module 18 could also communicate with the carriage 27 over a wireless radio frequency (RF) or infrared (IR) link in Rome embodiments.

Attached to the base of the frame 31 that holds the work module 18 are feet 30 that fit into slots 29 spaced at regular intervals on the front of the carriage 27. At the top of the frame 31 are a set of quarter-turn fasteners 32 shown open in FIG. 5 and closed in the other figures. The user places the feet 30 in the slots 29 and pivots the frame 31 so that the vertical rods 33 of the quarter-turn fasteners 32 go into the mating channels 34 on the carriage. By turning the fasteners 32 ninety degrees counter-clockwise, the rods 33 are locked in place. The channels 34 have a grooved surface and the quarter-turn fasteners 32 have a bit of spring along their pivot axis, so the rods 33 can clear the grooved surfaces as they rotate and fit snuggly in the appropriate grooves. In addition, the illustrated embodiment shows a friction-fit, matching dimple and bump 35 to the left of the unlatched quarter-turn fasteners 32. These two features, when engaged, help to securely hold the fasteners 32 closed even under conditions of prolonged shock or vibration. A myriad of quarter-turn, threaded, or other fasteners are currently manufactured that could be substituted for the fasteners shown in this embodiment.

The user defines an area over which the work should be performed and, in an ideal world, the invention would be able to proceed over the defined region without encountering any obstacles. In practice, however, the mobile unit 1 is likely to frequently encounter unexpected obstacles, including items deposited by the user, other humans, animals, or storms. The invention has a variety of mechanisms it can use to sense and avoid obstacles.

The first obstacle-avoidance mechanism shown in this embodiment is a set of ultrasonic proximity detectors 36, 37 mounted on the carriage and facing the front and rear respectively. These ultrasonic transducers 36, 37 transmit sonar pulses and capture the reflections to determine the nature of the objects in front of them. By mapping the amplitude and delay of any reflections, the mobile unit 1 can obtain a snapshot of any objects it is approaching. Ultrasonic transducers 36, 37 work well over the sensing distance; of a foot to several meter; that would be appropriate for most applications. They also work well under adverse weather conditions.

These same detectors could be replaced by or combined with ones using radar or lidar (light detecting and ranging) means. Yet another approach would be to use passive imaging components instead of bouncing pulses off of objects. In the imaging example, the detectors 36,37 could be visible or infrared (IR) cameras used in conjunction with image-processing software to detect potential obstacles. Since the camera would be moving, even a single row of passive detectors could be used, with software, to paint a two-dimensional image. There are other sensor types, such as capacitive or inductive, that another embodiment might use separately or in combination with the above-mentioned means to accomplish the obstacle-avoidance task.

The mobile unit 1 can protect itself from collisions through a second mechanism. The more sensitive portions of the work module 18 in the illustrated embodiment are designed to rotate out of harm's way when they encounter a rigid obstacle.

Figure 6:
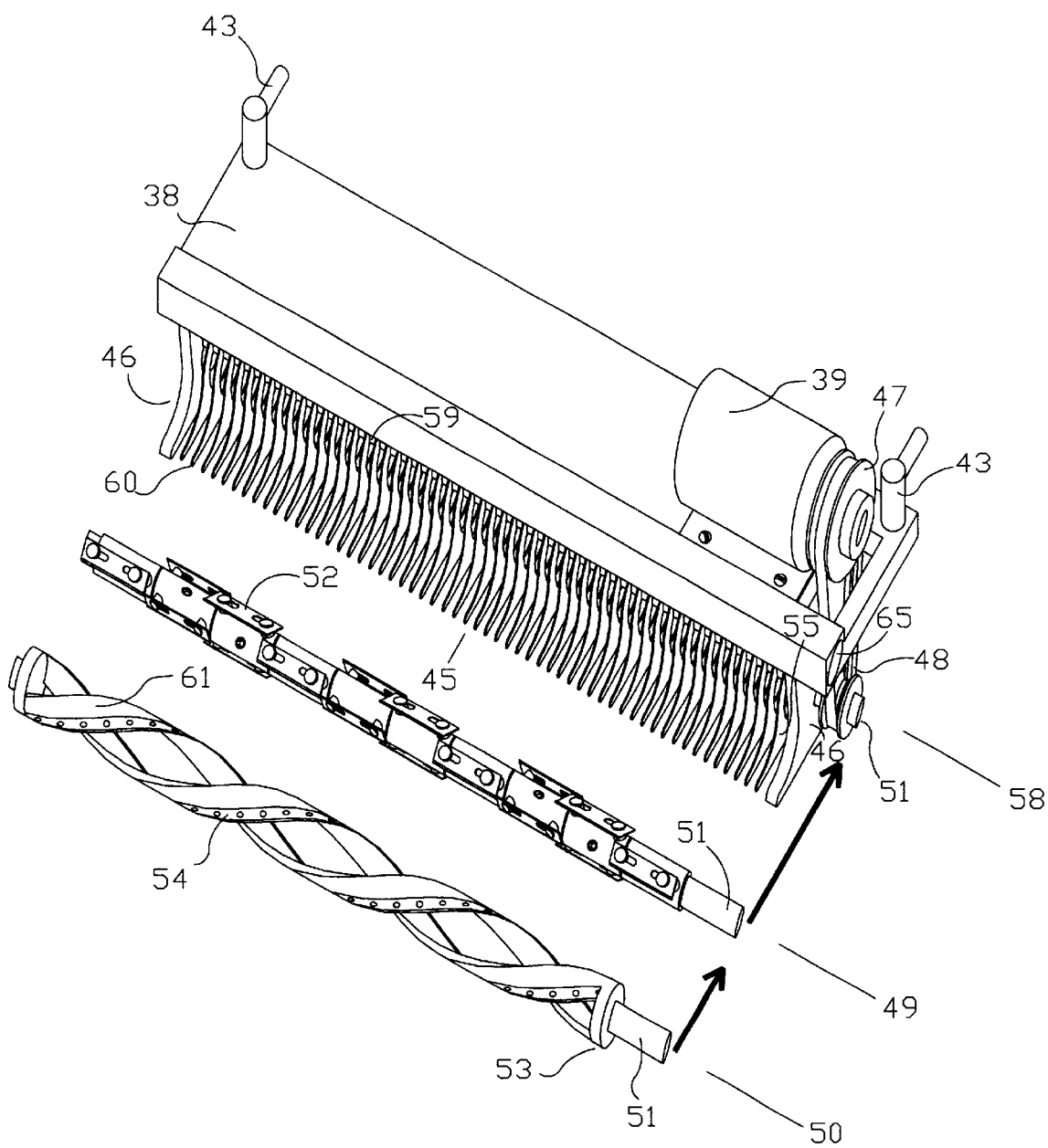
FIG. 6 illustrates a portion of one work-module embodiment and shows two possible embodiments of a vegetation-cutting blade assembly.

The work module 18 is suspended on a mounting frame 31 that is attached to the carriage 27. FIG. 6 shows an embodiment of a vegetation-cutting work module 18. The plate 38 that the motor 39 is mounted on pivots around a rod 40 that runs through the front edge of the plate 38 (see FIG. 5). In this embodiment, torsion springs 41 are positioned at each end of the rod 40. One tang 42 of each spring 41 are in a hole in the mounting frame 31. The springs 41 fit into a pair of countersunk regions 65 at each end of the shaft hole (see FIG. 6). At the bottom of these countersunk regions 65, there is a small parallel, but off-axis, hole for the other spring tang 64. The springs 41 rotate the back of the work module 18 toward the ground Posts 43 at each rear corner stop the rotation when they hit the lower rear bar 44 of the mounting frame 31.

The work module 18 will not need to rotate unless a short, small, rigid obstacle is able to defeat the obstacle detector 36 and impact the active area of the work module 18. In the illustrated embodiment, the active area is the cutter assembly 98, which consists of a blade assembly 49, 50 surrounded by a mechanical filter 45. The filter 45 is designed to allow grass and other vegetation to pass through, but to reject rocks, sticks, fingers, or toes. It also combs the vegetation for a more uniform and accurate cut. The blade assembly 49, 50 will probably be able to cut any items that can pass through the mechanical filter 45. Thus, in addition to providing an intrinsic safety feature, the filter 45 also enhances the life of the blades.

If an object does impact the active area of the work module 18, the impact will cause the rear of the work module 18 to rotate upward and out of the way. The movement will release a contact switch (not shown), alerting the mobile unit 1 to the impact so that it can proceed to take evasive action. Instead of a contact switch, other embodiments might use magnetic (Hall effect, Wiegand effect, etc.)

or optical switches to detect the rotation. There are larger probes 46 on each end of the mechanical filter 45 that are rugged and will encounter the object first if it is wide enough or off-center enough. Also, if the object has sufficient height, it will first collide with the rugged base plate 38. In both cases, the mobile unit 1 will detect that it is no longer moving forward and that its drive wheels 19 are slipping. It will abruptly move backward.

Under normal operating conditions, there will be a direct correlation between the drive signals sent to the wheels 19 and the change in mobile unit 1 position. When these do not correlate, the software will investigate the discrepancy and try to discern the problem. The information available to the program will include data from the obstacle detectors 36, 37 and the status of the work-module rotation switch identified above. Other feedback could include rotation sensors 71 at each of the motors 20 to identify a slipping transmission belt or a stalled motor 20. Finally, the sensors installed for inertial navigation 145, such as accelerometers and gyroscopes, would provide additional diagnostic feedback in the event of less than optimal operating conditions. By integrating all of this feedback, the invention will be better able to distinguish between such events as a wheel 19 slipping in a mud trough, a mobile unit 1 flipped on its back, or a vacuum work module 18 tangled up in a power cord. This sensor fusion is also useful in guaranteeing that the mobile unit 1 reliably performs such routine tasks as backing into an electrical probe 6 for recharging or closely tracing a path along the edge of a wall.

In the illustrated embodiment, the motor 39 on the work module 18 drives a blade assembly 49,50 for cutting vegetation (see FIG. 6). There is again a transmission 47 shown which will allow for an optimal matching of the motor and load characteristics, thus permitting the use of the smallest, least-expensive motor. The transmission 47 illustrated uses a belt 48, but could just as easily use a gearhead or other architecture. Like the earlier motors, this motor 39 could be a variety of types. The preferred embodiment uses a brushless DC motor for its quiet operation, reliability, and low maintenance requirements.

The illustrated embodiment of the mechanical filter 45 has a structure consisting of a portion of a hollow-cored cylinder that acts as its backbone 59. Protruding from this backbone 59 are thin sections of stiff, but resilient, shim material 55 that are spaced at a regular interval. The spacing is designed to permit vegetation to pass through and be cut, but to block larger objects from contacting the blades. The end of each shim 55 that is furthest from the backbone 59 tapers into a probe finger 60 that helps to collimate the vegetation and guide it into the openings. This embodiment is just one of many geometries that could similarly permit vegetation to pass through while blocking larger objects.

For the vegetation-cutting work module 18, FIG. 6 illustrates two embodiments of blade architecture. The first blade assembly 49 consists of sets of razor blades 52 mounted around a central shaft 51. Each blade set 52 is offset from its neighbors to allow the blades to overlap and to equalize the load on the motor 39 by having a uniform number of blades 52 cutting the vegetation as the shaft 51 rotates. The razor blades 52 illustrated are standard injector blades, but the architecture is flexible enough to permit any number of different standard or custom blade types. In the embodiment illustrated, the blades 52 are connected to shaft collars and held in place with interference, or press-fit pins. Other embodiments might use screws, adhesives, or other methods of adhering the blades 52. The illustrated blade assembly 49 would be inexpensive to fabricate and easy to replace. The blades 52 sweep through a cylindrical cutting surface. If the blades 52 rotate in one direction the roots of the vegetation provide an anchor to cut against. If the opposite rotation is used, the blades 52 cut against the bottom edge of the finger-guard backbone 59. Both rotations have their strengths and weaknesses.

FIG. 6 also illustrates a second embodiment of a blade assembly 50 architecture. In this architecture, a double helix is cut in a cylinder 53. The remaining metal is tapered into a wedge to present a narrow leading edge onto which a flexible blade material 54 is attached. The shape of the leading edge minimizes air turbulence and generates a spiral flow of air down the length of the cylinder 53 that will generate a small vacuum to help suck vegetation into the cutting surface. The blades 54 could be constructed from razor ribbon, discrete blade segments, abrasive particles or a variety of other materials. The blades 54 could be brazed, welded, screwed, glued or otherwise adhered to the rotating cylinder 53. The illustrated embodiment hag two spiral arms 61, but there could just as easily be three or more. A single arm could be used, but the resulting assembly would tend to be unstable and prone to vibration.

In this embodiment, the motor 39 is mounted above the cutter assembly 58 to maximize the percentage of the total mobile unit 1 width that is used for cutting. For other work modules 18, it may be desirable to mount the motor 39 directly on one end of the shaft 51. In this embodiment, the transmission 47 passes the rotational energy through the base plate 38 into a compartment adjacent to the cutter assembly 58 that is environmentally sealed with a protective housing 63 (see FIG. 1).

Other work module 18 tasks could be implemented with the illustrated geometry. In place of the cutter assembly 58 could be such work module fittings as a beater bar for a vacuum, a drum sander, a polishing cylinder, a trough for fertilizer distribution, a line of water jets, or a roller for the uniform application of a sealant or a coating. The vacuum and sander could have the same geometry as the cutter assembly 58 with the backbone 59 wrapped further around the beater bar or sanding drum and the shim materials 55 removed. The motor 39 could include a fan blade on its shaft to generate a vacuum to suck away dirt or dust for storage under the housing 62 until it could be emptied out the discharge port 147. These are just a few of the applications that would lend themselves well to the illustrated work-module 18 architecture. There is nothing, however, precluding the user from attaching a work module 18 with a different geometry to the front of the carriage 27.

FIG. 2 illustrates an embodiment of a user interface for the invention. In this embodiment the user commands the machine using a membrane switch 56. Other embodiments might instead use voice recognition, a set of switches, a touch screen, or any number of other interfaces. A membrane switch 56 is rugged and inexpensive. The user will recognize the illustrated twelve-key architecture because of its similarity to a standard phone keypad. Users will also be familiar with the use of the numbered keys to enter alpha-numeric data. The bottom line of the legends for the first nine switches is the standard one-to-nine numbering. The top line of these same switches contains the letters of the alphabet in triplets with the last triplet containing the number zero. In this embodiment, the left letters of each triplet are colored red, the middle letters green and the right letters blue. The middle lines of the legends for the switches in the bottom row are labeled red, green and blue respectively. This allows the user to specify the exact letter desired by pushing the switch with that letter followed by the matching color in the bottom switch row. Spaces can also be indicated by pressing the red switch followed by the green switch as indicated by the top legend line for these switches. The user can, therefore, enter any combination of words, expressions, or sentences with the illustrated membrane switch 56.

The middle lines of the first nine switch legends are commands that the user can use to program the invention. This is one possible embodiment and should not be viewed as exclusive of a plethora of other configurations. The goal is to have a simple, yet multifunctional user interface.

The illustrated embodiment uses audio for the machine to communicate with the user. It is now a simple task to store large quantities of high-quality audio in inexpensive integrated circuits. While another embodiment might use speech synthesis, the preferred embodiment would have the mobile unit 1 choose from a collection of prerecorded audio messages to respond to a predictable set of situations. The illustrated embodiment of this invention is connected to the WWW, so it will be easy to update the message set as new circumstances are encountered or now tasks are added. While an audio output would be inexpensive, flexible, and user friendly, this does not preclude the use of other output genre in different embodiments. These might include liquid crystal displays (LCD), fluorescent, plasma, light-emitting diode, or field-emitter displays, to name only a few.

As described above, it may be desirable for the user to program the mobile unit 1 to perform its specified task during the night. The illustrated embodiment does not depict a lighting source, but a preferred embodiment would include a night-light to enable the invention to be seen and avoided by people or animals who might be crossing its path. Such low-level lighting could be provided by a back-lit, tradename icon or similar display readily viewable from any direction. Backlighting could be efficiently supplied from a variety of industry-standard light sources, including electroluminescent, woven fiber optic, light-emitting diode, compact fluorescent, neon, or incandescent.

When programming the invention, the user must direct the mobile unit 1 around the perimeter and connector paths of the desired work area. To direct the mobile unit 1, the user threads a guidance rod (not shown) into the connector 57 located at the back of the machine. One embodiment would have the rod be hinged to allow the user to adjust the rod end height to a comfortable level during use in a manner similar to that used with traditional upright vacuums. Other embodiments might have the rod snap in place rather than be threaded. Yet another embodiment might use two rods and a connecting handle so that the mobile unit 1 could be handled more like a traditional mower during programming.

Electronics

A wide variety of electronic components could be used to implement the functions described in this invention. In this embodiment, the electronics are assumed to be mounted on the underside of the housings 13, 16, 62.

Figure 8:
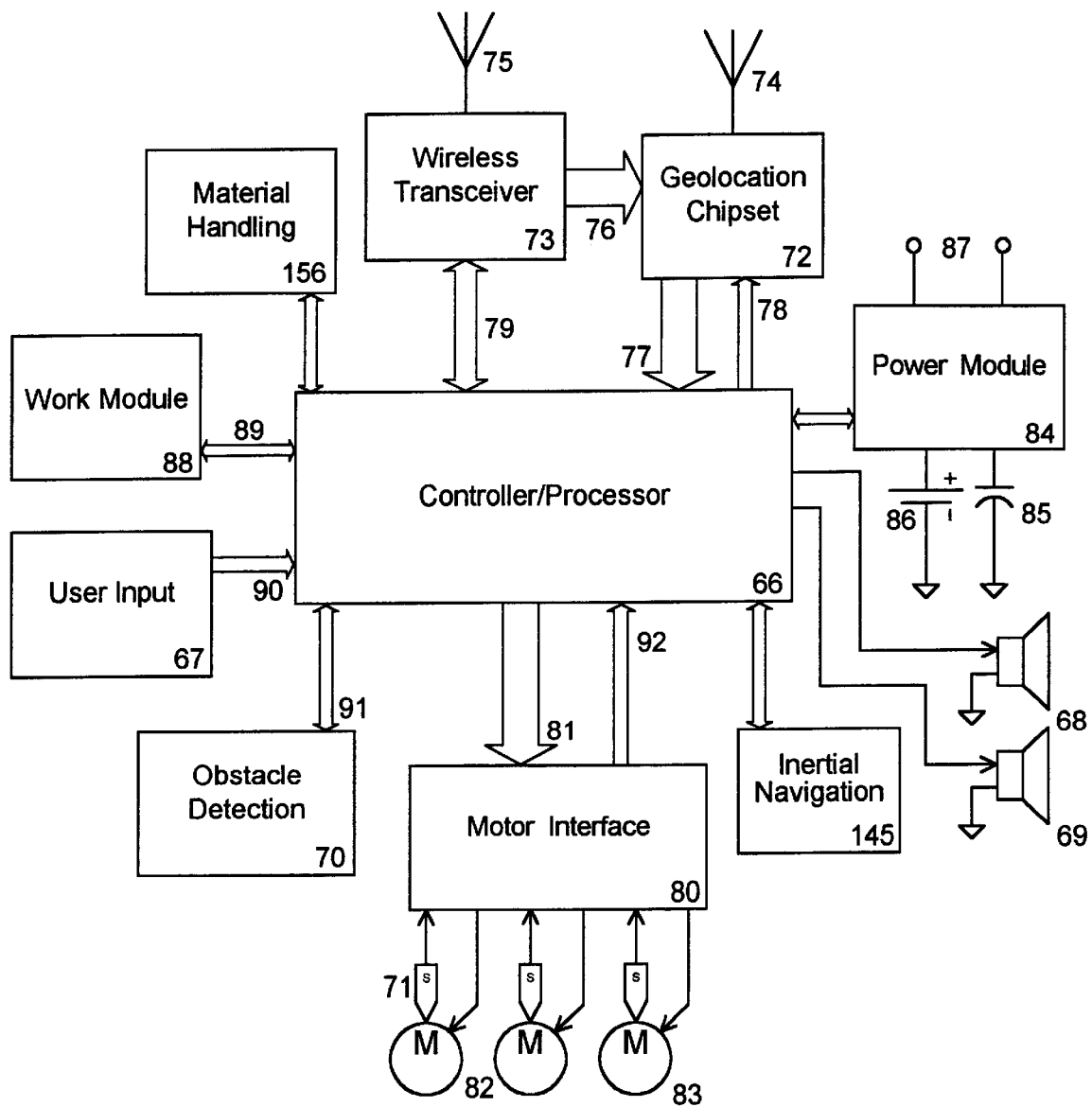
FIG. 8 is a functional block diagram of one embodiment of the electronics in the mobile portion of the invention.

FIG. 8 is a functional block diagram showing one embodiment of the relationship between the major electronic components that make up the mobile unit 1 portion of this invention. The central element is a controller or processor 66 that interfaces with each of the other system elements.

One of the functions of the Controller/Processor 66 element is to process position information, compare it against stored boundary data, and use it to direct the movement of the mobile unit 1. These tasks involve a lot of numeric calculations. A logical type of integrated circuit (IC) to implement them is therefore a digital signal processor (DSP) or a reduced instruction set computer (RISC). Other tasks, such as the user interface 67–69 and sensor interface 70, 71, 145 might be better handled with a traditional microcontroller IC, because they typically include on-chip, analog-to-digital converters (ADC). The Controller/Processor 66 function could be partitioned between these types of ICs and others.

The function labeled Geolocation Chipset 72 includes the circuitry responsible for determining, with great precision, the physical location of the mobile unit 1. A preferred embodiment would consist of a RTK-GPS receiver. The term geolocation will be used in this document to mean the three-dimensional, global-positioning coordinate calculated by the Geolocation Chipset 72.

The primary role of the wireless transceiver 73 is to receive position-correction data from a second, non-mobile, satellite-navigation receiver means for those applications requiring improved positional accuracy. In the embodiment illustrated, the fixed or reference satellite-navigation receiver means uses the RTK-GPS and is located at the fixed station 2. In other embodiments, as described in the mechanics section of this text, the reference receiver function could be provided by a number of other sources, including a local radio station, the United States Coast Guard, USFAA, or a dedicated receiver servicing a number of mobile units 1. The electronics used to convey the location corrections might consist of a spread-spectrum transceiver or a standard low-power transceiver operating at a frequency approved for appliances by the United States Federal Communications Commission (USFCC) or other similarly-functioning government regulatory body. In a preferred embodiment, the broadcast would be encoded or encrypted to allow the receiver to filter the desired signal from noise or from messages transmitted by other appliances.

After decoding the signal received through its antenna 75, the wireless transceiver 73 will deliver the received signal to the Geolocation Chipset 72 which will use it to correct data received from its own antenna 74. Companies are currently manufacturing printed circuit boards (PCBs) with combined wireless transceivers and RTK-GPS receivers. These PCBs generally have extra processing power that could be used for many or all of the functions needed for the Controller/Processor 66 tasks.

In the illustrated embodiment, the wide data-flow arrows 76, 77 on the functional diagram show the dominant flow of data from the wireless transceiver 73 to the Geolocation Chipset 72 and subsequently to the Controller/Processor 66. Setup and control signals 78, 79 also flow between the Controller/Processor 66 and these functions. In addition, the Controller/Processor 66 will use the wireless transceiver 73 to send status reports to the user via the fixed station 2.

The Controller/Processor 66 uses the received geolocation data to guide the mobile unit 1. It sends control information to the Motor Interface 80 via a data bus 81. In the embodiment illustrated, the invention is propelled by two separately driven motors 82, one for each of the drive wheels 19. There is also at least one motor 83 to power the work module 18. Much of the motor-control task could be performed in the Controller/Processor 66 circuitry or, perhaps, through the use of a dedicated motor control IC such as the ADMC328, fabricated by Analog Devices, Inc.

For applications where the receipt of satellite navigation signals may be intermittent or subject to multipath, an inertial navigation means 145 is shown that communicates with the Controller/Processor 66. This function will be particularly useful for indoor applications where the walls of the structure may generate substantial multipath. If the mobile unit 1 keeps track of its differential path from a known reference location, it can use that information to help it identify which of the received signals is line of sight and which is multipath If all satellite communication is lost, inertial navigation will enable the mobile unit 1 to proceed substantially on course until communication is restored. The inertial navigation means 145 might include such devices as gyroscopes or other angular-rate sensors, accelerometers, magnetometers, or wheel-rotation encoders.

The sensors 71 attached to the motors provide the Controller/Processor 66 with feedback 92 regarding the operational state of the motors. This feedback might include back electromotive force (emf), Hall or Wiegand effect pulses, or the precise rotational information provided by magnetic or optical rotary encoders.

The mobile unit 1 has Obstacle Detection circuitry 70 to control and process sensor inputs. In a preferred embodiment, the Obstacle Detection circuitry 70 would include the control of ultrasonic, lidar, or radar proximity detectors 36, 37. The Obstacle Detection circuitry 70 would generate pulses and capture the reflected images. It would then transfer 91 the data to the Controller/Processor 66 where the signals could be processed to reveal any impending collisions. Passive imaging devices, such as visible or IR charge-coupled devices (CCDs) could be substituted for the active proximity detectors 36, 37. In this case, the Controller/Processor 66 would use image-processing software to detect less than optimal operating conditions in the received images. The Obstacle Detection circuitry 70 might also include circuitry to interface to inductive or capacitive proximity sensors 36, 37.

Another sensor input for obstacle detection 70 might include a switch indicating the rotation of the work module 18 in its mounting bracket 31. Such a rotation might reveal that the mobile unit 1 had contacted fallen debris or a fixed object. It might also indicate that the mobile unit 1 is moving too rapidly for the given work medium. For instance, when using a mower work module 18, a rotation warning might indicate that the vegetation is too thick or too tall for the current mobile unit 1 speed.

The illustrated invention embodiment has all of the user interface functions 67–69 incorporated on the mobile unit 1 itself In other embodiments portions of this interface could be moved to or duplicated on the fixed station 2, or as a separate module attached to the guidance rod used to direct the mobile unit 1 during programming. The illustrated embodiment uses a membrane switch 56 for its User Input circuitry 67. The membrane switch 56 is connected to the Controller/Processor 66 electronics via a data bus 90, In the preferred embodiment, the mobile unit 1 uses a speaker 68 to convey information to the user, especially during programming. In other embodiments, the mobile unit 1 could use a variety of display screens, including touch screens, in place of the speaker 68, but they would probably be less flexible and more expensive. During the operational mode, the speaker 68 could be used in combination with the wireless transceiver 73 to convey distress signals in the event that the mobile unit 1 becomes disabled or is in the process of being stolen.

The FIG. 8 block diagram shows a piezoelectric buzzer 69 as an additional part of the user interface. The buzzer 69 could be useful as an alternative, inexpensive way to convey certain information to the user.

The mobile unit 1 obtains its energy from the Power Module 84. It will need to have an energy storage element, which might consist of capacitors 85 and a battery pack 86. If the battery pack 86 has a high energy density and responds well to deep discharges, the mobile unit 1 will be able to travel a large distance between recharges. A nickel cadmium or nickel metal-hydride battery technology would work well. Capacitors 85 and or lithium batteries 86 could provide backup power to maintain critical information in the event of a power failure.

The batteries 86 could be recharged using photovoltaics mounted on the surface 16, 62 of the mobile unit 1. A preferred embodiment would require the mobile unit 1 to return to the fixed station 2 periodically to be recharged. The mobile unit 1 could use standard battery-charge monitoring techniques, including voltage and temperature monitoring, and current integration to assess when charging is complete and when a recharge is required.

The embodiment illustrated shows the mobile unit 1 coupling to the fixed station 2 for recharging using a conductive interface 87, but the linkage could also be inductive. Both are well understood technologies. For the case of inductive coupling, rectifying circuitry would be required to convert the received energy to direct current (DC).

The illustrated work module 18 requires only electrical power for the resident motor 39. Other work modules would include on-board electronics. The work-module electronics 88 is shown communicating with the controller/processor electronics 66 over a serial or parallel data bus 89.

For those embodiments where it is useful to supply materials for, or collect wastes from, a process, the Material Handling 156 block includes the circuitry that will regulate the flow of such materials. The circuitry might include controls for hydraulic or pneumatic valves that will regulate the flow of liquids, solids, or gasses from a port 147 on the mobile unit 1 to a mating port 146 on the fixed station 2. The corresponding Material Handling 155 circuitry in the fixed station 2 is shown in FIG. 9.

Figure 9:
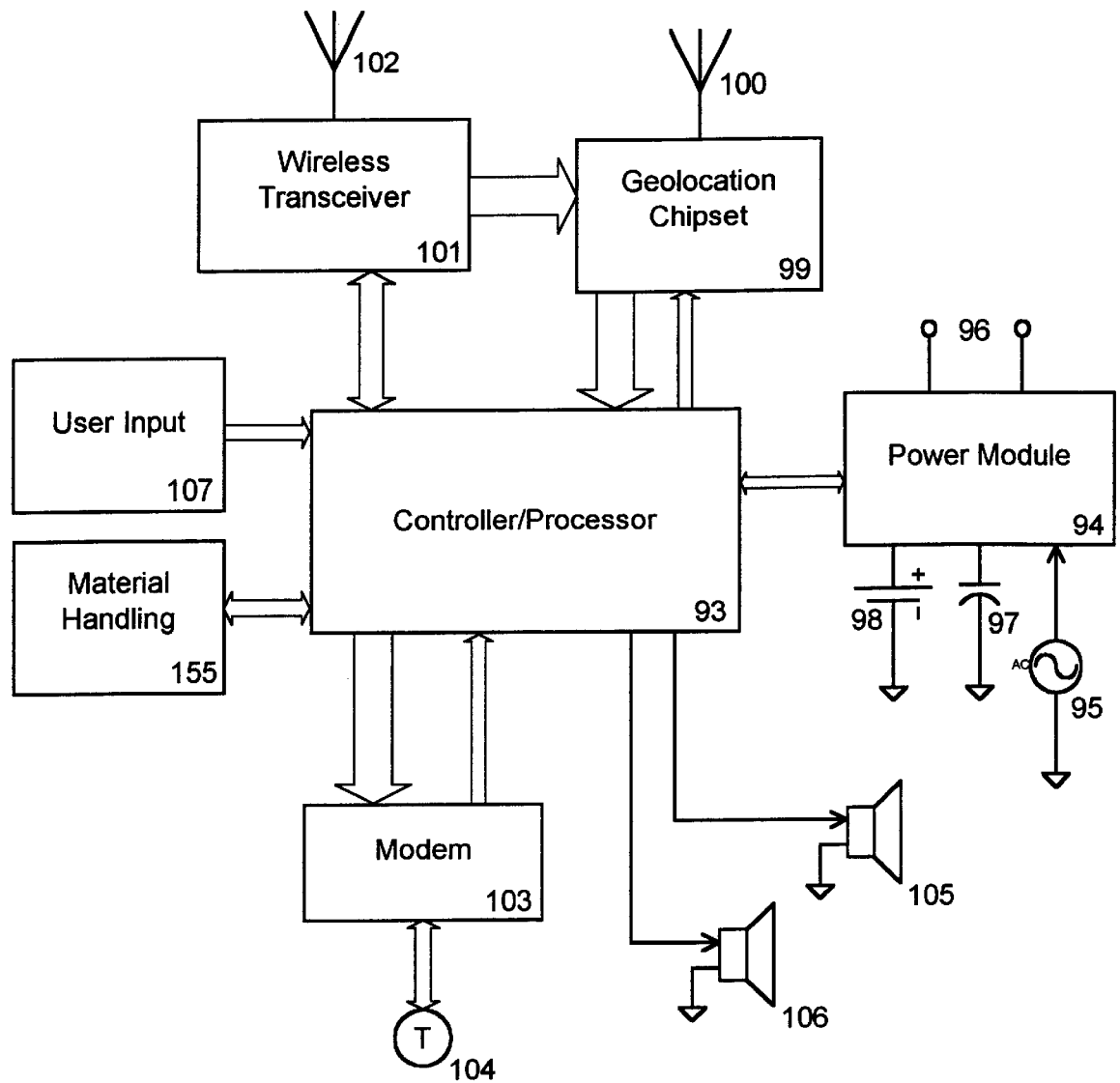
FIG. 9 is a functional block diagram of one embodiment of the electronics in the fixed station portion of the invention.

FIG. 9 is a functional block diagram of one embodiment of the fixed station 2 electronics. The central element is a controller or processor 93 that interfaces with each of the other system elements.

As discussed earlier in this document, the functions that support the operation of the mobile unit 1 can be distributed over a variety of entities and locations. For simplicity they are shown grouped together at the fixed station 2 in this embodiment. One of these support functions is the energy-providing means. In FIG. 9, the Power Module 94 is connected to a power source 95. The power source 95 would generally be the utility grid, but might also be a stand-alone generator or alternative-energy source.

In this embodiment of the invention, the mobile unit 1 will sense when its battery 86 energy is low and return to dock with the fixed Station 2. Energy will be transferred to the mobile unit 1 either through the illustrated conductive coupling 96 or through an inductive coupling. The Power Module 94 will have circuitry to adapt the grid power 95 to the coupling 96 technology used.

The Power Module 94 might have a capacitor 97 or a battery 98 to maintain critical functions and information in the event of a power failure. A lithium battery, which has a long shelf life, would be appropriate for this function.

A second mobile unit 1 support function shown in the illustrated embodiment as being located at the fixed station 2 is to provide a reference point for geolocation calculations. Since the fixed station 2 is not moving, a RTK-GPS receiver, or other satellite navigation receiver, placed there can identify errors introduced into the signals received from the satellites. These errors may be introduced for national security reasons by a government, or because of noise in the environment. The Geolocation Chipset 99 receives position information from its antenna 100. Since it already knows its location, it is able to work backwards and identify errors in the incoming data. The Geolocation Chipset 99 then uses the wireless transceiver 101 to transmit error correction factors over its antenna 102 to the mobile unit 1.

The Controller/Processor 93 might also use the wireless transceiver 101 to send messages to the mobile unit 1 while it is performing its specified task. Such messages might include a call for the mobile unit 1 to return to the fixed Station 2 for reprogramming. One embodiment would have another user interface 105–107 at the fixed station 2 to facilitate this task. Such an interface might consist of user input 107 from a membrane switch and program output through a speaker 105 and perhaps a buzzer 106. The speaker/buzzer 105, 106 might also be helpful as an alternative alert mechanism to warn the user of problems since the fixed station 2 may be located closer to the user's home or workplace. There are many other configurations that would permit the user to communicate with the invention through the fixed station 2. The preferred, illustrated embodiment would have the user communicate with the mobile unit 1 at the mobile unit 1 itself or through such media as email, an analog phone connection, or the WWW as described in the third support function listed below.

A third mobile unit 1 support function shown in the illustrated embodiment as being located at the fixed station 2 is to connect the mobile unit 1 to a user-support network. The fixed station 2 could be plugged into the user's phone network 104. The user might then program the invention to dial up a local Internet Service Provider (ISP), perhaps in the middle of the night, using the illustrated modem 103. The invention would be able to send status reports to a central-monitoring facility. This facility could in turn send status reports via email or voicemail to the user, or post secure information on a website. These reports might include maps of the designated work areas, work statistics, problem reports, or theft reports.

Software

Before the invention can accomplish its defined task, the user needs to specify the regions where that task should be performed. In the illustrated embodiment, the user teaches the software by walking the mobile unit 1 around the borders that confine these regions. If the geometry of a work area is complicated, it's quite likely that the user may make an error in programming the perimeters. It is also quite likely, that the desired perimeters will change over time as the needs of the user change. For both of these reasons, the user should be able to add, delete, or modify individual paths without having to reprogram the data for the entire work area. The embodiment of the invention discussed below provides such flexibility.

Viewed from behind the mobile unit 1, the illustrated embodiment of the invention is designed to have the right-hand side of the work module 18 overhang the right-hand drive wheel. This feature allows the mobile unit 1 to perform its particular task very close to edges or walls. If the work module 18 cuts vegetation, this geometry will allow the mobile unit 1 to trim vegetation across edging barriers. By properly placing border edging, the user can then easily instruct the mobile unit 1 to simultaneously trim and mow a lawn.

To effectively make use of the work module 18 overhang described above, the user should place the right side of the mobile unit 1 adjacent to the perimeter edge when teaching the software where that path exists. Another way of stating this is to say that outside or external perimeters should be programmed using a counter-clockwise rotation and inside or internal perimeters should be programmed using a clockwise rotation. Obviously, the opposite rotation conventions could be used with the work module 18 overhang placed on the opposite side of the carriage.

Figure 10:
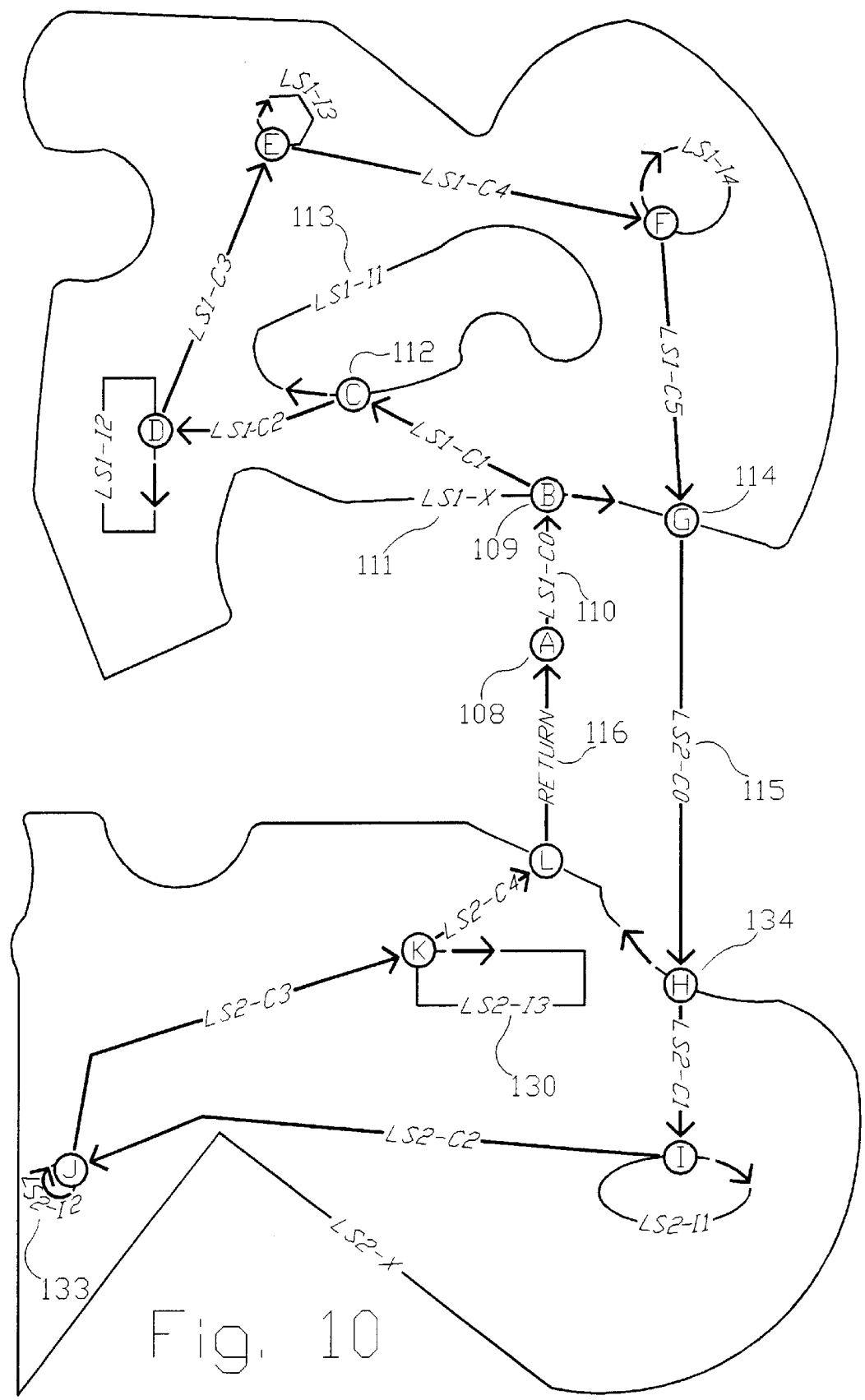
FIG. 10 illustrates how a user might guide the mobile unit around the various functional perimeters of an example work area.

FIG. 10 illustrates a set of work areas and shows how a user might have programmed them. The geometry and application are arbitrary, but for many of the examples presented below, the two regions will be assumed to be the front ad back yards of a woman's home.

Such a plot could be available on a personal WWW page provided for the user by a customer-service program, or sent to the user by fax, or email, or some other delivery mode. The plot illustrates the boundary paths that were defined by the user. There are two types of paths in the overall path definition: perimeters and connectors. Perimeters define the inside and outside edges of work areas. Connector paths specify the route that the user would like the mobile unit 1 to travel between adjacent perimeter paths. It makes sense for the user to define these connector paths as part of the perimeter definition process since it will involve no significant additional programming effort and help assure that the mobile unit 1 travels quickly along safe connector routes. In another embodiment, however, it would be straight forward for the mobile unit 1 to use its own connector path routing algorithms to link perimeter paths.

For each work region there is one external perimeter path which encompasses any number of internal perimeter paths. The collection of paths associated with a particular work region will be called a loop set. Each loop set will therefore consist of one external perimeter path and the collection of internal perimeter paths contained within that path. The loop set will also include one connector path leading from either another loop set or the fixed station 2 to the beginning of the external perimeter. Each of the connector paths connecting the internal loops in that loop set is also part of the loop set. Finally, the connector path leading from the last internal perimeter path to the edge of the external perimeter path is defined to be a part of the same loop set.

In FIG. 10, the transition points or nodes where one path segment ends and another begins are illustrated with circles containing a letter denoting the sequence in which the nodes were programmed. The first node 108 shows where the fixed station 2 is located. In this case, the fixed station 2 is not part of a work area so the user pulled the mobile unit from the first node 108 to the second node 109 where the first external perimeter began. This first connector path is labeled LS1-C0 as illustrated 110 on the drawing. The 'LS1' indicated that this path is part of the first loop set. The 'C0' indicates that this is the connector path that leads from the fixed station 2, or the end of a previous loop set, to the start of the current loop set. Connector paths are traveled with the mobile unit 1 facing backwards because it can move faster and traverse obstacles more easily in reverse. The work module 18 is likely to be the most delicate portion of the mobile unit 1, and it is shielded when the mobile unit 1 is traveling backwards. The large diameter of the drive wheels 19 relative to the front castor wheels 22 makes it easier for the mobile unit 1 to climb over steps or other obstacles that may be in its path when it is traveling backwards. The mobile unit 1 will retrace the connector paths described by the user during programming, so it is only logical that the user should pull the mobile unit 1 backwards when programming connector paths.

After reaching the second node 109, the user pushed the mobile unit 1 forward in a counter-clockwise direction around the first external perimeter, which is labeled LS1-X on the plot 111. The 'LS1' again references the first loop set. The 'X' specifies that this is the external perimeter path for this loop set. When the user finished the external perimeter 111, she pulled the mobile unit 1, with the large wheels 19 leading, to the third node 112. She then pushed the mobile unit 1 clockwise around the first internal perimeter, thereby defining that no work should be done inside of that perimeter. The label 113 for the first internal perimeter is LS1-I1. The 'LS1' again references the first loop set and the 'I1' dictates that this is the first internal perimeter for this loop set.

The user continued defining the perimeters and connector paths in the order indicated by the lettered circles. When she crossed over the first external perimeter at the seventh node 114, the program ended the first loop set and began the first connector path 115 for the second loop set. After the user finished programming all of the loop sets, she returned the mobile unit 1 to the fixed station 2 to complete the programming. The last connector path 116 is labeled Return on the plot and is not part of any loop set.

This is just one technique by which the user can define to the invention the area over which to perform the desired operation. The software algorithms described below assume that the user followed the above convention.

If the geolocation information for any of the connector paths or perimeters is known to the user, she has the option of entering it remotely, perhaps through a WWW site.

Figure 11:
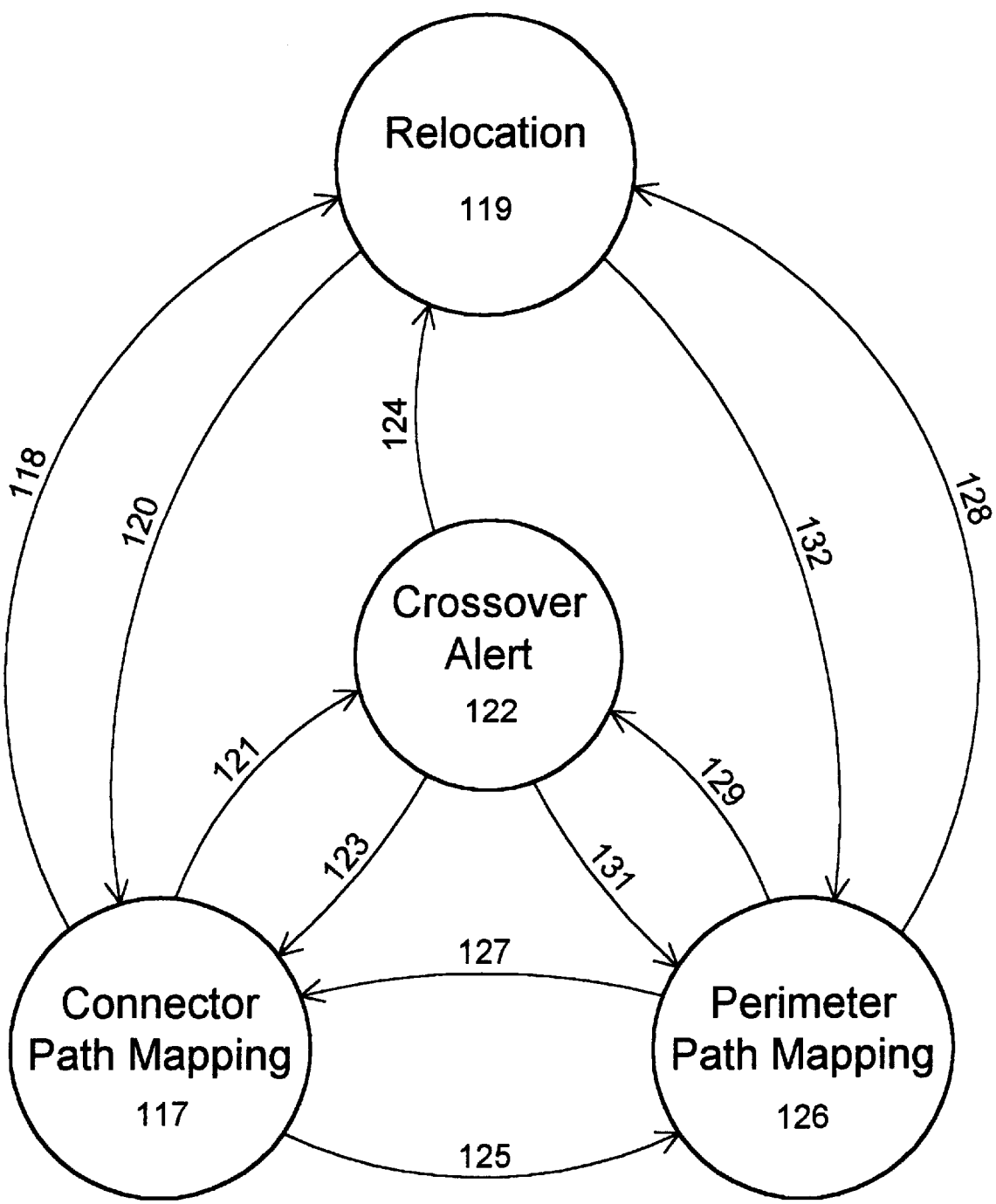
FIG. 11 is a state diagram of one embodiment of the software that would enable the user to program the region over which work is to be performed.

FIG. 11 illustrates one embodiment of a state diagram for programming the movement of the mobile unit 1. The user may find it desirable to have the mobile unit 1 perform its task only at night when she is asleep or away from the operating area. However, she may also program the invention to operate continually or over any set of time constraints.

The user starts the initial programming at the fixed station 2. She may start to make program modifications anywhere. When the user wants to execute a program change, if the mobile unit 1 is not present at the fixed station 2, she may summon it in from the work areas or proceed out to intercept it where it is currently functioning.

To begin programming the mobile unit 1, the user must enter the password she has created for herself In the illustrated embodiment, the user would press the 'Passwd' key on the membrane switch 56 and enter her password. This step causes the software to transition from its operational mode into its programming mode. The user should then attach the guidance rod to its mating connector 57 on the mobile unit 1 so that she can direct the movement of the mobile unit 1 as desired.

In the described embodiment, the program stores the geolocation data specifying the paths and operating regions as vectors and matrices. There are two principal path descriptor matrices. The first, called the full path matrix, includes the geolocation data for the full path, which is the alternating sequence of connector and perimeter paths programmed by the user as described above. A separate set of pointer vectors references each of the junction points in the full path matrix between the various connector and perimeter paths. The second path matrix, called the perimeter matrix, includes the geolocation data for only the perimeter paths. It also has a supporting set of pointer vectors that references each of the junction points between the perimeter paths. When the user makes changes to the path describing the boundaries of the work area, data are spliced in and out of these matrices using the pointer vectors. The pointer vectors are then updated to reflect the new geometry.

Connector Path Mapping State 117

Perimeter paths are connected to one another and to the fixed station 2 with connector paths. As stated above, the mobile unit 1 travels backwards over connector paths to protect the work modules 18 and to provide better ground clearance so that the mobile unit 1 may travel rapidly from perimeter path to perimeter path. The terrain of connector paths between loop sets may be more difficult to navigate than the work areas themselves. The large drive wheels 19 help the mobile unit 1 clear obstacles.

In the preferred embodiment of the operational mode, the mobile unit 1 will first travel along the programmed perimeters for a given loop set, as defined by the user. The mobile unit 1 will route its subsequent interior passes using a hunt algorithm described later in this document. If more than one loop set is programmed, the mobile unit will use the 'C0' connector paths to travel between them. At any time, the mobile unit 1 may need to return to the fixed station 2 to be recharged. It utilizes the connector paths to help it make that journey rapidly, while minimizing the probability of encountering obstacles.

When the user is programming the mobile unit 1, the software can query sensors 71 that indicate the direction of wheel 19 rotation. If the mobile unit 1 is not being pulled backward during the programming of a connector path, the program will inform the user and request that the mobile unit 1 be rotated and returned to the last point where it was correctly oriented. If the distance to that point is more than a predetermined threshold, the software will make a transition 118 from the Connector Path Mapping state 117 to the Relocation state 119. In the Relocation state 119, the software will inform the user how far she is from the desired location and stop recording new path data. When the mobile unit 1 arrives within a threshold distance of that location, the software will move 120 back to the Connector Path Mapping state 117 and begin acquiring geolocation data.

When the user begins a programming session, if the path matrix is empty, then the mobile unit 1 knows that this is a full programming session. If the mobile unit 1 is not located at the fixed station 2, the program starts in the Relocation 119 state and directs the user to move the mobile unit 1 to the fixed station 2 to begin the programming.

When the user arrives at the fixed station 2, the program switches 120 to the Connector Path Mapping state 117. As the user pulls the mobile unit 1 toward the starting point for the first perimeter path, the software records the connector path information as geolocation data arrive.

If the path matrix is not empty, the mobile unit 1 will ask the user if she wants to delete all existing path information. If she presses the 'Yes' key on the membrane switch 56, the mobile unit 1 will delete all of the path matrices and pointer vectors and proceed as described above.

If the user presses the 'No' key, or does nothing, the software will again begin operating in the relocation state 119 and inform the user how far she is from the closest programmed path. The program will inform the user to select the 'Start' option on the keypad 56 when she has reached the modification starting point on the path she wishes to change. Operation of the Relocation state 119 is described in the section with that name below.

As the user guides the mobile unit 1 along a desired connector path, the software accumulates geolocation data and assembles them into a temporary matrix. The program calculates the physical distance between each new data point and the other points in this temporary matrix in order to detect path crossovers. While it is not a fatal error for a connector path to cross over itself, it should be avoided for efficient operation. The software, therefore, has the capability to warn the user when she is about to cross over her earlier path. The detection algorithm ignores a predefined number of points immediately trailing the current data point. With these points excluded, if the minimum distance spec is violated, then the user has either tried to turn the mobile unit 1 in too small a radius of curvature or has looped back on herself. When this event occurs the software moves 121 to the Crossover Alert state 122 and warns the user of the impending crossover.

After the warning is issued, the user can stop and back up the mobile unit 1 along the path she has just taken to a point that is outside of the alert zone. The program detects the reversal of direction and removes the data points as they are retraced, while simultaneously broadcasting to the user her distance from the original path. Once outside of the alert zone, the software switches 123 back to the Connector Path Mapping state 117. If, for whatever reason, the user ignores the warnings and proceeds to implement a crossover, the software has the option of deleting the current connector path construction and changing to the Relocation state 124, which will direct the user back to the beginning of the path for another try. Such a step is optional because an erratic connector path will continue to be Functional as long as it eventually reaches the correct destination.

The software also calculates the physical distance between the current data point and all of the previous perimeter data points. When the user approaches an existing perimeter path too closely, she is warned to back away from the path. Here a crossover is more critical because the software assumes that it is forbidden for the mobile unit 1 to cross over a perimeter path, since such paths often surround trees, tables, cabinets or other impenetrable objects. A failure, by the user, to heed the warnings will cause the path in progress to be aborted and the software to return 124 to the Relocation state 119.

During a normal programming sequence, when the user is guiding the mobile unit 1 with the correct orientation and clear of existing boundaries, geolocation data is accumulated in a temporary matrix. The state of what will be termed a 'splicing vector' will determine how this data is processed. The splicing vector is created in the Relocation state 119 and consists of two numbers: an entry value and an exit value. The software categorizes the state of this splicing vector into four path-mapping groups based on the entry and exit values. The qualifications for each group are as follows: 1) The vector is empty, meaning that no entry or exit point is defined. 2) An entry point exists, but no exit point is defined. 3) Both the entry point and the exit point are defined and they are located in the same loop set. 4) Both the entry point and the exit point are defined and they are located in different loop sets.

When the user is creating a path matrix initially, or after having erased the entire existing path matrix, each connector path will be a Group 1 mapping. During the programming of such a connector path, the user will be told to press the 'Start' button when she is ready to begin the next perimeter path. The user should also rotate the mobile unit 1 at the starting point and begin pushing the mobile unit 1 forward around the intended perimeter. The software correlates the sensed wheel rotation and the user input. If the user pushes the start button, but does not rotate the mobile unit 1, or rotates the unit, but does not press the start button, the software will query the user regarding her true intent. When a new perimeter path is begun, the temporary path matrix for the finished connector path is appended to the full path matrix, with new pointers added to reference that the last data point received ended a connector path. The software then changes 125 to the Perimeter Path Mapping state 126.

If, during the mapping of a connector path, the user moves within the warning zone of the external perimeter of the given loop set, the program will alert the user as described above. Here, however, the warning will contain the option of proceeding across the perimeter if the user intends to finish the programming of that loop set. If the user does pass across the external perimeter, the connector path data is appended to the total path matrix. In addition to adding an end of connector path pointer, the software adds a pointer to mark the close of a loop set. The software then begins accumulating geolocation data for a new connector path leading from the just-completed loop set to the start of the next loop set.

If the splicing vector has an entry point, but no exit point, then the connector path is part of the Group 2 mapping identified above. This situation occurs when the user has expressed a desire to modify a single connector path. While the software is accumulating path data in the temporary path matrix, it will also inform the user how far she is from the path that is being modified. The user will be advised to press the 'End' key on the keypad 56 when the modification is completed. The program will only accept the modification if the user is within a predetermined distance of the original path when she presses the 'End' key.

When this condition is met, the geolocation data that has been stored in the temporary path matrix is substituted for the existing path data between the entry and exit points defined in the splicing vector. The program updates the path pointers to account for the resulting increase or decrease in path data points. The software then returns 118 to the Relocation state 119.

In the Relocation state 119, the program tells the user how far the mobile unit 1 is from any existing paths. If the user wants to make further modifications, she should guide the mobile unit 1 to the next path she wishes to modify. When the mobile unit 1 arrives within a predetermined distance of a given path, the user has a set of options which will be discussed in the Relocation state 119 section.

If the splicing vector has an entry point and exit point in the same loop set, then the user is in the process of adding an integer number of connector and perimeter path pairs within the current loop set. The software recognizes this as a Group 3 mapping. In this category, the temporary path matrix may contain more than one path. As each path is completed, the program retains the data within the temporary matrix, but a set of temporary pointers is created to mark the path transitions.

The user interface for a Group 3 mapping is similar to that for a Group 1 mapping with the exception that the program will continually inform the user how far away she is from the modification exit point. The exit point is where she needs to finish her changes. While adding connector paths, if the user selects the 'Start' switch, the program will transfer 125 to the Perimeter Path Mapping state 126 and update the temporary pointer vectors to indicate the path transition point. Similarly, when the user completes a perimeter path, as described in the Perimeter Path Mapping section below, the program moves 127 back to the Connector Path Mapping state 117 while again updating the temporary pointer vectors.

This mode of path generation will continue until the user reaches the location specified by the splicing vector exit point. The exit point is, by definition, the starting point for an existing internal perimeter path. The software is watching for two conditions. The first required condition is that the last path generated, prior to arriving at the exit point, be a connector path. The second condition is that the mobile unit 1 has remained inside of the external perimeter path throughout the modification. If the user ignores warnings and punches through the external perimeter path, the modification is abandoned, and the program returns 118 to the Relocation state 119. If the user attempts to approach the exit point, which is a point on a perimeter path, while programming another perimeter path, the software will warn her of the impending collision. If the user chooses to ignore the warning, the program will abandon the modification and again return control 128 to the Relocation state 119.

If the user arrives at the exit point defined in the splicing vector without punching through the external perimeter path and while programming a connector path, the software will incorporate the temporary matrix into the full path matrix. As described for the Group 2 mapping, the temporary path matrix is substituted for the data points in the full path matrix that are between the entry and exit points defined by the splicing vector. The temporary pointer values are also substituted for any existing pointer values that lie between the splicing vector's entry and exit values. Pointer values that point to a section of the path matrix beyond the substitution point will need to be updated to reflect the increase or decrease in quantity of data points caused by the substitution.

If the splicing vector has an entry point and an exit point in different loop sets, then the user is in the process of adding an integer number of connector and perimeter path pairs which may include one or more full loop sets. This situation is characterized above as a Group 4 mapping. In this case, as in the Group 3 mapping, the temporary path matrix is likely to contain more than one path. As each path is completed, the data is kept within the temporary matrix, but a set of temporary pointer vectors is generated to mark the path transitions.

In a Group 4 mapping, the end point in the splicing vector will be the first point of an external perimeter path. In the Group 3 mapping, the program instructed the user to remain within the current loop set throughout the entire path modification. In the Group 4 mapping, however, the path that completes the modification must be the connector path that occurs immediately after a loop set is completed. If the entry point is within a loop set, the user is expected to complete that loop set and then add zero or an integer number of complete loop sets prior to finishing up with a connector path to the exit point.

The geolocation data for a Group 4 mapping is accumulated in a temporary path matrix along with pointer elements as described for the Group 3 mapping. In addition, the software performs the usual safety checks as the data is collected, including the avoidance of loop crossovers (self and mutual) and improper wheel rotation.

When the user completes a path modification, as discussed above, the software will incorporate the temporary matrix into the full path matrix. As in the Group 3 mapping, the temporary path matrix is substituted for the data points in the full path matrix that are between the entry and exit points defined by the splicing vector. The temporary pointer values are also substituted for any existing pointer values that lie between the splicing vector's entry and exit values. Pointer values that point to a section of the path matrix beyond the substitution point will need to be updated to reflect the increase or decrease in quantity of data points caused by the substitution.

In each of the connector-path mappings described above, the user has the option at any time of aborting the path generation or modification. If she does so, by pressing the 'Abort' key on the membrane switch 56, the software will delete the temporary matrices and vectors and return 118 to the Relocation state 119. If the user was modifying an existing path, the software will then provide nearest path information to help the user select a new path to modify. If the user was creating a new path, then the software will guide her back to the current endpoint of that path.

When the user is initially constructing or reconstructing a path, if she completes a loop set and then returns the mobile unit 1 to the fixed station, the software assumes that the programmed path is complete and exits the programming mode.

Perimeter Path Mapping State 126

The purpose of the programming process is to define the boundaries or perimeters of each work area. In this embodiment, these perimeters have a set of loop properties that help the software control the application. These properties are: 1) A perimeter path must be a continuous loop that stops and starts at the same location and never crosses over itself. 2) The user must program each perimeter with the right-hand side of the mobile unit 1 adjacent to the perimeter. In this embodiment of the invention, the right-hand side is the side where the work module 18 extends out past the wheel-base to permit work to be done close to barriers or over the top of edging. 3) As a result of the second property, the outside loop of each loop set is programmed in a counter-clockwise direction, while all of the internal loops within that loop set are, by definition, programmed in a clockwise direction. 4) As a result of the first property, a perimeter has one connector path arriving and one connector path departing from a common point on the loop. 5) Each perimeter path must remain a predetermined minimum distance away from all other perimeter paths. The minimum is generally a distance that will allow the mobile unit 1 to pass between the two paths.

When the user reaches the point where she would like to begin a perimeter, she selects the 'Start' key on the keypad 56. She then begins to follow the perimeter while the program accrues the geolocation data in a temporary matrix. During the perimeter mapping, the program will announce how far the mobile unit 1 is currently located from the starting point of that perimeter. Ideally, the user will have placed a physical marker on the ground, or floor, at the starting point, with the loop number indicated. The relative-position readouts help provide additional guidance.

As in the connector path mapping described above, the software will check the geolocation data, as it arrives, against both earlier data from the same path as well as points from all other existing perimeter and connector paths. The program will be checking to make sure that the new perimeter is not about to cross over itself or another path. If such a crossover is imminent, the software shifts 129 to the Crossover Alert state 122 and issues a warning. If the warning is ignored, the programming of this perimeter is aborted and the state diagram returns 124 to the Relocation 119 state. If, instead, the user backs the mobile unit 1 out of the warning zone, the retraced data points are removed and the user is able to resume the path in a non-intersecting direction, thus ensuring that the fifth loop property remains valid. The software will then hand control 131 back to the Perimeter Path Mapping state 126.

When the user arrives back within a predetermined distance of the loop start, the first loop property identified above has been satisfied and the software joins the perimeter at the ends.

Next the software checks the rotation of the just-completed loop. By checking the number of entries of each type of path pointer, the program will determine the properties of the just-completed loop: loop set number, type of perimeter (internal or external), perimeter number, etc. It can then determine the rotation of the just-completed loop and make sure that the direction matches that required for the given perimeter type as specified in the third loop property.

One method of determining the direction of rotation in which a given loop was programmed is to sort the geolocation data by their longitudinal coordinates. The slope of the curve at its most extreme longitudinal point indicates the direction, or rotation, in which the loop was programmed. A complicated loop may zigzag back and forth across many meridians, but if it is to return to its starting point, it has to have points that are maximally east and maximally west. By examining whether the points that were programmed immediately prior to these extreme points are more north or south of them, one can determine the direction in which the entire loop was programmed.

If the rotation is not appropriate, the software will instruct the user to rotate the mobile unit 1 one hundred eighty degrees and travel the opposite direction around the perimeter path. Since perimeter loops stop and start at the same point, there is no reason to pass through the Relocation state 119 when this type of error occurs.

During a normal programming sequence, when the mobile unit 1 is traveling with the correct orientation and clear of existing-boundaries, the software accumulates geolocation data in a temporary matrix. As described above for the Connector Path Mapping state 117, the state of the splicing vector, which is generated in the Relocation state 119, will determine how this data is processed. The four defined groups of splicing vector values are repeated below: 1) The vector is empty, meaning that no entry or exit point is defined. 2) An entry point exists, but no exit point is defined. 3) Both the entry point and the exit point are defined and they are located in the same loop set. 4) Both the entry point and the exit point are defined and they are located in different loop sets.

When the user is creating a path matrix initially, or after having erased the entire existing path matrix, each perimeter path will be a Group 1 mapping. For this group, when the user finishes a perimeter, the program appends the temporary path matrix to the full path matrix and adds new pointers to reference that the last data point received ended a perimeter path. The software then moves 127 to the Connector Path Mapping state 117.

If a given loop set does not contain any internal perimeters, the user will turn outward after completing the external perimeter and proceed to the starting point for the next loop set or back to the fixed station 2. If there are internal perimeters, the software is able to detect the completion of a loop set when the mobile unit 1 crosses back over the external perimeter. If there are no internal perimeters, the software uses the mowing grid described in the operational software section below to detect whether the mobile unit 1 is turning into or out of the external perimeter when that perimeter is finished. If the grid weighting is decreasing, then the mobile unit 1 is turning away from the just-completed loop. The software will inquire whether the user indeed wants to finish the loop set without any internal perimeters. If the user presses the 'Yes' key, or proceeds forward without responding, the program marks the end of the external perimeter also as the end of the loop set and begins recording the connector path to the next loop set. If the user answers 'No', the user may back up the mobile unit 1 and the program will delete the recorded connector path data points while informing the user how far she is from the recorded path.

Group 3 and 4 splicing vectors indicate path modifications that, by definition, end with connector paths. The program in the Perimeter Path Mapping state 126 will, therefore, leave the path data in the temporary matrix and update the temporary pointer vectors only prior to handing off control 127 to the Connector Path Mapping state 117.

A group 2 splicing vector indicates that the user is attempting to modify an existing perimeter path. When the user selects the perimeter path to be modified by pressing the 'start' key on the membrane-switch 56, the program will transition 132 to the Perimeter Path Mapping state 126. Just as in the similar case for the Connector Path Mapping state 117, the software will broadcast the distance from the original path to help guide the user to the endpoint of the modification. The program will alert the user to press the 'End' switch when the path modification is complete. The switch input will only be accepted if the user is within a predetermined distance of the original path when she selects it.

When the user programs an acceptable reentry point, the software substitutes the temporary path matrix for the existing path data between that point and the modification entry point. The program then updates the path pointers to account for the resulting increase or decrease in path data points. The software then returns control 128 to the Relocation state 119.

In the Relocation state 119, the mobile unit 1 tells the user how far it is from any existing paths. If the user wants to make further modifications, she should guide the mobile unit 1 to the path she wants to modify. When the mobile unit 1 arrives within a predetermined distance of a given path, the user has a set of options which are described in the Relocation state 119 section. If, however, the user has completed her modifications, she just needs to return the mobile unit 1 to the fixed station and the software will automatically return to its operational mode, The user may also press the 'Passwd' key on the membrane switch 56 at any time to end the programming session. The program will ask the user to confirm the selection and then return to its operational mode.

In each of the perimeter path mappings described above, the user has the option, at any time, of aborting the path generation or modification. If she does so, the software will delete the temporary path matrix and transition 128 to the Relocation state 119. If the user was modifying an existing path, the software will then provide nearest path information to help the user select a new path to modify. If the user was creating a new path, the software will guide her back to the current endpoint of that path.

Relocation State 119

During a programming session, when the software is not actively recording geolocation data for a perimeter or connector path, it resides in the Relocation state 119. If the user follows the correct procedures for programming the path initially and never needs to make modifications at a later date, the software may never enter the Relocation state 119. It is likely, however, both that the user's needs will change with time and that she will make programming errors. The Relocation state 119 helps the user when these events occur.

This document has described many instances, during the initial path programming, when a user might do something that causes the software to enter the Relocation state 119. The user may have pushed the mobile unit 1 along a path when she should have pulled it. If the user is moving quickly, she may have moved a fair distance before her error was brought to her attention. The program will enter the Relocation state 119 in order to inform the user where the last valid data was recorded so that she can return to that site before continuing.

Similarly, if she does not heed crossover warnings, the current path segment may be aborted and the software will enter the Relocation state 119 in order to guide the user back to the end of the previous segment.

The user herself may get confused, or change her mind about a perimeter or connector geometry half way through the programming of that path segment. Under these circumstances, she may decide that it would be easier to abort the current path segment and return to the starting point to try again. The software will enter the Relocation State 119 and guide her to a point where she can resume programming.

The user will find the Relocation state 119 software the most useful when she wants to change an existing path set, especially if she takes advantage of user-support capabilities. The fixed station 2 is connected to phone lines. If the user elects to tie in to a support database, the mobile unit 1 can call a local Internet service provider (ISP), or other contact point, periodically, preferably in the middle of the night when the phone is not likely to be in use. The mobile unit 1 could upload path data and statistical information which the support database could process and return to the user via email, web page access, or phone mail. This data could include statistics on how frequently the desired task was performed or warnings if the mobile unit 1 runs into obstacles or gets stuck somewhere. The support utility could also alert the user of a machine breakdown or theft if the mobile unit 1 fails to report in at the usual time. Software could be upgraded automatically and the user could be reminded about required maintenance.

In one embodiment of the invention, the user may be using a vegetation-cutting work module 18. She may decide that she wants to make some landscaping changes to a given loop-set area. Perhaps she has decided that there is not enough sun in her backyard for the existing vegetable garden, but that fruit trees would do well there. It may have been years since she originally programmed the mowing path. If she is making use of the support database, she could visit the WWW site and print out a graphical plot of her mowing program with each of the paths numbered. Such a plot might look like FIG. 10. Another option would be to call a support number and have the same information faxed to her.

Were she to do so, she would see that the garden is perhaps bounded by internal perimeter number three of loop set two, which is denoted 130 by 'LS2-I3' in FIG. 10. To remind herself, she might cross out that boundary. After she has replaced the garden with sod and trees, she could approach the mobile unit 1, enter her password, and push it out into her yard. As she approached various path segments, the mobile unit 1 would announce the identity of the particular segment. She, of course, knows where the garden was, so she heads directly there.

As she draws close to the previous garden edge, the mobile unit 1 will announce that she is on internal perimeter number three of loop set number two. If she selects the 'Add' key on the membrane switch 56, the software will ask her if she wants to add the new perimeter path before this path.

If she selects 'Yes', the connector path that precedes the path she is standing on will be deleted. The program will create a splicing vector with an entry point at the end of the previous perimeter path and an exit point at the beginning of the current perimeter path. The mobile unit 1 will then guide the user to the splicing-vector entry point.

If, instead, she presses the 'No' key, the program will create a splicing vector with an entry point at the end of the current perimeter path and an exit point at the beginning of the next perimeter path. Since the current perimeter is the last perimeter in this loop set, the splicing vector is a Group 4 type. The exit point is therefore the starting point of the next loop set's external perimeter. Since there are currently no additional loop sets shown in the example illustrated in FIG. 10, the exit point will be the fixed station 2. The mobile unit 1 will then guide the user to the splicing vector entry point.

In this example, the user will instead push the 'Delete' key on the membrane switch 56. The mobile unit 1 announces that internal perimeter number three of loop set number two has been deleted. She can always press the 'Undo' key if she makes an incorrect entry. The program will create a splicing vector with an entry point at the end of the perimeter path before the deleted perimeter, and all exit point at the beginning of the perimeter path after the deleted perimeter. As described above, the deleted perimeter path is the last one programmed in this example, so the exit point for this splicing vector will be the fixed station 2. The mobile unit 1 will then guide the user to the splicing-vector entry point.

When the user reaches the entry point, the program transfers control 120 to the Connector Path Mapping state 117. The user may then proceed to program paths to and around each of the new fruit trees. The program will continually inform the user how far she is from the desired endpoint. After completing the last tree, the user will proceed to the specified endpoint and the resulting modification will be substituted for the original perimeter and two connector paths. Since this was a Group 4 splicing vector, the user could have proceeded to add any number of additional complete loop sets before approaching the splicing vector exit point.

After reaching the exit point, the program returns 118 to the Relocation state 119 and the user is free to make any additional modifications. In this specific case, because the exit point was also the fixed station 2, the program will automatically return to its operational mode. If the user desires to make additional modifications, she will need to reenter her password.

In the illustrated embodiment, the mobile unit 1 can be returned to its operational mode at any time simply by pressing the 'Passwd' key on the membrane switch 56. The program will ask for a confirmation from the user before exiting its programming mode.

In the fruit tree example, the user only deleted a single perimeter. The user is actually free to delete, in a single modification, any number of adjacent perimeter and connector path pairs, but if an external loop is deleted, then all the internal perimeters contained within that external loop are also deleted. As a result, only a single loop set can be partially deleted in a single modification. Additional loop sets, if selected, are deleted in their entirety.

Scheduling

In the illustrated embodiment, when the user finishes programming path data, the mobile unit 1 will ask the user for scheduling information. In addition, at any time during the programming sequence, the user may initiate task scheduling by pressing a two-key sequence. If the user presses the middle and then right key of the bottom row of the membrane switch 56, the program will ask the user to confirm that she wants to enter scheduling information. If she presses the 'Yes' key, the program will inquire whether the task should be performed continuously. If the user again presses the 'Yes' key, the scheduling is complete. If the user presses the 'No' key, the program will ask the user to enter a starting time. The user employs the number keys to enter the starting time. The program will then ask the user if the time entered is before noon. The user will again enter her response with the 'Yes' or 'No' key. The same programming sequence will follow for the ending time. The program will then inquire whether there are additional times the user would like to enter. If she answers, 'Yes', the above programming sequence will continue until she is finished. The software then asks whether the entered times should be used every day. If the user presses the 'Yes' key, the scheduling session is complete. If she presses the 'No' key, the program will ask her to press the numbers on the keypad 56 that match the days of the week to which she would like these times to apply, with Sunday as 1, Monday as 2, etc. The above is just one example of how the membrane switch 56 could be used to program scheduling information.

The GPS satellites have on-board atomic clocks. GPS receivers can extract this timing information with great precision and provide it to the mobile unit 1 for the scheduling of tasks.

Scheduling for the mobile unit 1 can also be programmed remotely. The user could access her support-service WWW page and call up a scheduling program resident there. Using this medium, it would be easy for her to program any mix of task times and dates over any time period. If the user does not have WWW access, she could accomplish the same task using a touch-tone phone. The support service could send the user a confirmation of her selections via fax, email, or conventional mail.

Other programming tasks could be accomplished using the Internet. In the programming example given above, a user eliminated a garden and added fruit trees to the perimeter information for her mowing application. If she had simply desired to eliminate the garden, she could have done so by accessing her perimeter plot on the WWW. She would find and delete the perimeter that represents the garden and then draw a new connector path between the two perimeters adjacent to the deleted perimeter.

As a further extension of the mowing example, the user may decide that she doesn't want the application to be performed over a certain portion of the programmed region temporarily. She may have programmed the mower to mow continuously, but will be using a portion of her lawn for a wedding one Saturday. She could easily exclude this region in her perimeter plot on the WWW and specify the period of the exclusion. These are just a few examples that demonstrate the flexibility of the programming interface for this invention.

The user could also use her designated WWW page to provide detailed information about the work areas. Continuing the example of the woman adding fruit trees to a lawn, she could enter data on her web page describing the type of fruit tree at each location. Earlier, she may have added information detailing the location and species of grass, flowers, and trees present in different sections of the yard. The mobile unit 1 can create its own contour map of the elevation of different portions of the yard and use it to create information about site drainage. On-line geographic information systems (GIS) could contain a variety of information that would also be helpful, including such things as detailed, historical weather information and pest or disease tracking. A supporting software utility could integrate all of this data and use it to schedule a complex itinerary of tasks for the mobile unit 1, perhaps requiring the automatic multiplexing of different work modules 18 at different times over the course of a year. Expert software could incorporate the expertise of authorities in related fields and apply it to the needs of each user.

As an extension of the on-line support utilities described above, service companies could be created to come on site and do the initial programming tasks for the user. A landscaping company, for instance, after creating a new landscape for a home, could program an instance of the invention to maintain that landscape.

Operational Mode

Figure 12:
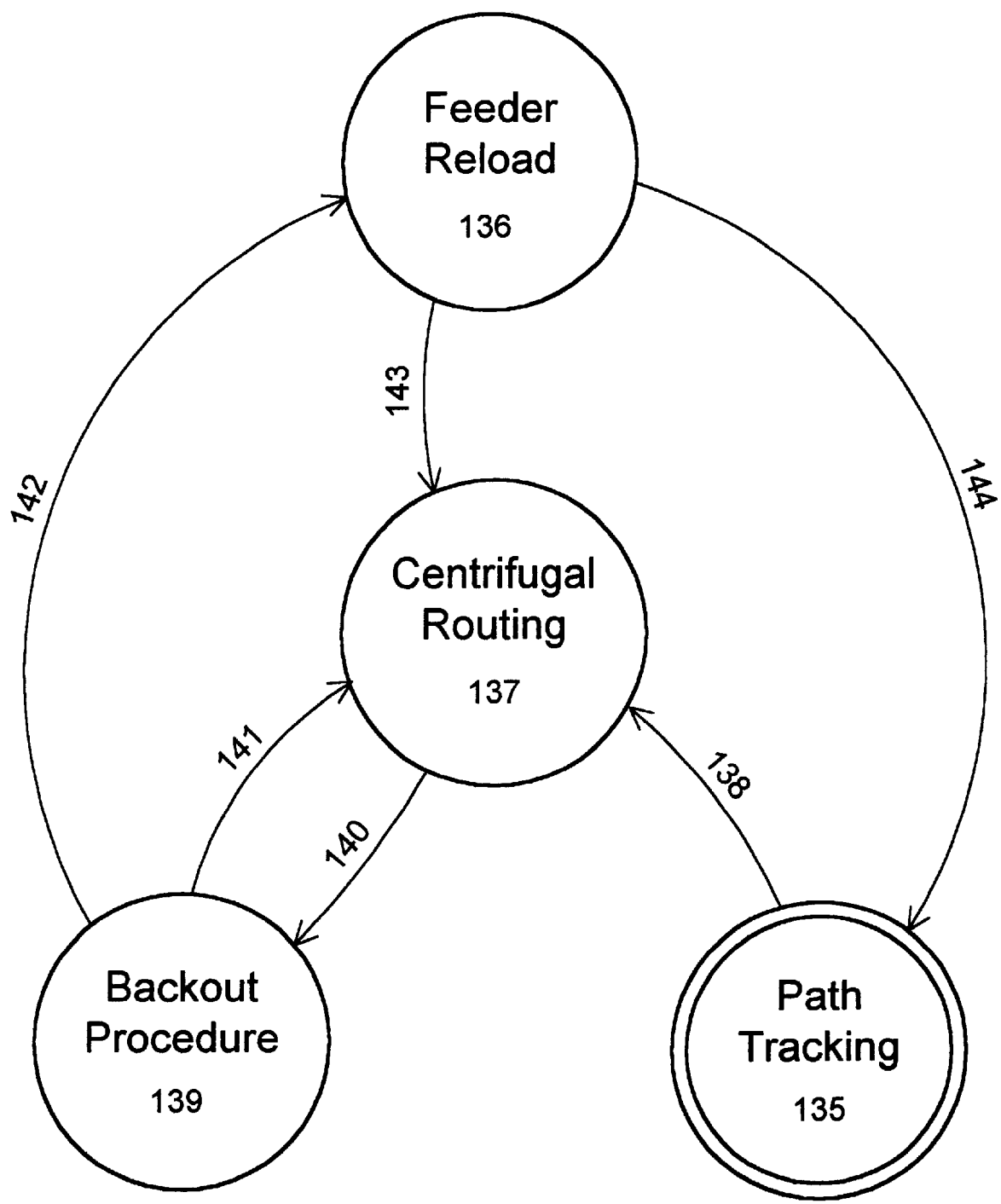
FIG. 12 is a state diagram of one embodiment of the software that would guide and control the mobile unit while it is performing its programmed task.

FIG. 12 is the state diagram for one embodiment of the mobile unit's 1 operational-mode software. The default position for the mobile unit 1 is next to the fixed station 2 where it can be inductively or conductively recharged. If the user programs the device for continual activity, then the mobile unit 1 will remain coupled to the fixed station 2 for only that time required for recharging. If the user specifies that the mobile unit 1 should only be active during certain hours, such as in the middle of the night, then the mobile unit 1 will stay coupled to the fixed station 2 during the periods of time when it is not performing its task.

There are many different algorithms that could be used to determine the path of the mobile unit 1 during each work period. The algorithm described here is designed to efficiently and accurately cover any work area geometry with as little duplication and back-tracking as possible, while enabling the mobile unit 1 to adapt to unexpected obstacles.

The mobile unit 1 will execute the following top-level steps repeatedly during each activity session. They may be interrupted at any time by the requirement to return to the fixed station 2 for recharging.

1. Travel the path defined by the first loop set
2. Travel the area enclosed by the first loop set using 'centrifugal routing'
3. Repeat steps 1 & 2 for the remaining loop sets
4. Return to the first loop set and repeat steps 1–3

The user defines the work area perimeters. The mobile unit 1 will follow these perimeters as precisely as the geolocation circuitry will permit. The current resolution of the RTK-GPS is several millimeters. The movement of the mobile unit 1 inside of the perimeter paths need not be nearly as accurate if an adequate amount of overlap is included.

In this embodiment, to simplify the internal travel, the software maps each loop set into a two dimensional grid with the grid spacing set equal to some fraction of the width of the mobile unit 1 (perhaps one-half or two-thirds). As the mobile unit 1 traverses these grid points, it will overlap its previous movements because the grid points are closer together than the width of the mobile unit 1. This overlap relaxes the positioning accuracy required in these locations and allows the mobile unit 1 to move more rapidly. The built-in overlap also helps accommodate changes in path curvature as the mobile unit 1 moves from one grid point to another. The grid system simplifies the routing algorithms and reduces the amount of data storage required. If the user can tolerate less exact perimeter mappings, other embodiments of the invention could use the DGPS or other less precise navigation systems. In the illustrated embodiment, the fixed satellite navigation receiver is likely to be positioned very close to the work area of the mobile unit 1. The DGPS, in combination with an inertial navigation system, might be able to provide accuracy approaching that of the RTK-GPS.

A simple inertial navigation system would calculate the relative movement of the mobile unit 1 from the fixed station 2 using wheel 19 rotation information proved by the illustrated sensors 71. This information could be combined with rotation information from a wheel that is not motor driven to help eliminate errors caused by a loss of wheel traction. More accurate inertial navigation systems could include gyroscopes, accelerometers, magnetometers, inclinometers, and angular rate sensors. The inertial navigation information will help the navigation circuitry to filter out position errors caused by satellite multipath and to stay on course when the mobile unit 1 fails to receive signals from a sufficient number of satellites.

As the user records the perimeters of a given loop set, the software calculates the maximum number of grid divisions that will be required to span the most extreme geolocations along both the latitudinal and longitudinal axes. The program sets up a two-dimensional mapping matrix of a size slightly larger than the number of grid points along each axis. Data points in this matrix then map to grid points in the work area.

The values stored at each of these grid points provide information to the program about the status of this location in the loop set. The actual values are arbitrary, but as an example, the software could use a zero to represent all grid locations that the mobile unit 1 must avoid. Such grid points will usually be those that are outside of the perimeters defined by the user. Similarly, the program could specify that a nine value corresponds to a grid over which the mobile unit 1 needs to perform a task. Further, the code could use a five to indicate a grid location over which the mobile unit 1 has already performed its task. Other possible values will be introduced as needed during the discussion below.

The default state for the mapping matrix is for all of the grid points within the defined perimeters to have a nine value and for all grid points outside the defined perimeters to have a zero value. As the mobile unit 1 passes over a given grid point, it changes its value from a nine to a five. When there are no remaining sites with a value of nine, the mobile unit 1 knows that it has completed a full pass of the work area. It then sets all of the eligible grid points back to a value of nine and repeats the process.

In the illustrated embodiment, the mobile unit 1, for simplicity, has only a single antenna, so it cannot determine its rotation from a single data point. However, by correlating wheel motion with changes in geolocation, the program can determine the mobile unit's 1 rotation. The software then quantizes the rotation into one of eight vectors spaced forty-five degrees apart. These eight vectors correlate with the connecting paths between any grid point and its surrounding eight grid points. As a set, they are sufficient to fully describe the motion of the mobile unit 1 over the mapping grid and will be referred to as movement vectors.

Path Tracking State 135

When a work session begins or a recharge operation is completed, the software enters the Path Tracking state 135. Prior to returning to the fixed station 2, the program will have stored a pointer to the last completed data point in the perimeter matrix. If the pointer shows that the mobile unit 1 had been traveling on a perimeter path, the mobile unit 1 will return to a point a predetermined distance earlier on that same path segment.

Rather than retrace the full path up until that point, the program will link together loop-set connector paths with straight lines. FIG. 10 is an illustration of the physical layout of a potential set of work areas. If the mobile unit 1 was working on path LS2-I2 133 when it needed to travel to the fixed station 2 for recharging, it will return to the work area as follows. First it will travel along connector path LS1-C0 110 from the fixed station 2 to the external loop of loop set #1. It will move with its drive wheels 19 leading and its work module 18 trailing. It will then follow a straight line from the second node 109 to the exit point for this loop set, which is the seventh node 114. The method used to determine and follow this straight-line path is described in the Feeder Reload state 136 discussion which follows. Depending on the geometry of the work area, a truly straight line path may not be possible. The straight-line algorithm will route the mobile unit 1 around obstacles as it encounters them. The mobile unit 1 will next follow connector path LS2-C0 115 to the eighth node 134, which is the starting point for the external perimeter of loop set #2. The software will guide the mobile unit 1 along a straight-line path across loop set #2 to a point a predetermined distance back from the point where it had stopped working on perimeter LS2-I2 133. The path overlap gives the mobile unit 1 a chance to establish the correct movement vector before resuming its task where it had stopped for recharging.

If the mobile unit 1 was working on an internal grid point when it needed to be recharged, it will follow a similar return path to the one described in the preceding paragraph. It takes exactly the same path until it reaches the edge of the loop set where it was previously operating. The software then maps a straight line path to the closest unprocessed grid point (grid value=9), which may or may not be the place where it left off work. The centrifugal routing algorithm does not need to follow the same work path each time. Small variations introduced by returning to a different grid point, as described above, cause the entire subsequent internal work path to change, as in a chaotic process. This randomness helps ensure that, in the unlikely event that the mobile unit 1 misses a spot in one pass, it will cross over it in the next.

Centrifugal Routing State 137

The software moves 138 from the Path Tracking state 135 to the Centrifugal Routing state 137 after completing the tracing of the perimeter path for a given loop set. This routing algorithm is a simple look-ahead process. The mobile unit 1 is positioned on a grid point with a certain rotation, or movement vector. The software knows which grid point is directly ahead and which are within a normal single-step arc motion of that grid point.

Sharp turns disrupt rapid and fluid mobile unit 1 motion. As stated in the Path Tracking section above, the movement vectors are quantized into one of eight values rotated forty-five degrees apart. The software knows where the mobile unit 1 is currently located. The current movement vector points to the next grid point the mobile unit 1 will cross. The Centrifugal Routing algorithm looks another step forward and chooses from a set of grid points consisting of the grid point that is a continuation of the current movement vector and those that would require a rotation of that movement vector in either direction. In this embodiment, the software limits the movement vector rotation to plus or minus 45 degrees in any single step, so with each step there are three grid points in the selection set.

The algorithm must avoid prohibited grid points ('0's) and is searching for unprocessed grid points ('9's). If more than one nine is present, the software will choose the one with a set rotation from the current movement vector (clockwise, in this embodiment). As a result, the mobile unit 1 will migrate to the outside edge of the mapped area and work its way inside in a spiraling pattern. The term 'centrifugal routing' is simply illustrative of the apparent force pushing the mobile unit 1 to the outside edge. Hugging the perimeter is an efficient method of minimizing the number of sharp turns required to finish a work area.

Backout Procedure State 139

For almost any mapped area, there will come a point where the centrifugal-routing algorithm alone will not suffice. If the perimeter has sharp bends or is irregular in shape, the mobile unit 1 will almost certainly encounter occasions before it is finished where none of the three available look-ahead grid points has a nine value. The software then hands off control 140 to the Backout Procedure state 139. In this state, the software will attempt to back the mobile unit 1 out from its current location in a quick back-and-turn operation that rotates the work module 18 back toward the middle of the mapped area, where it can expect to find more unprocessed grid points.

Before implementing a backout procedure, the software will examine a set of backout options beginning with the least complicated and proceeding to those that may require a modest amount of path retracing. The algorithm looks first for processed grid points (those with a '5' value) to back up over. This helps eliminate any danger that the work module 18 would get stuck backing up over unprocessed ('9' value) grid points. It then looks for a backwards movement that is within the turn radius of the mobile unit 1 and that will rotate the movement vector counter clockwise to expose a new set of grid points, at least one of which has a nine value. Once an unprocessed grid point is located, the backout step is implemented and the software returns 141 to the Centrifugal Routing state 137.

Feeder Reload State 136

If the backout procedure does not yield an unprocessed grid point, the software proceeds 142 to the Feeder Reload state 136. The Feeder Reload state 136 performs two principal tasks. The first task is to locate an adjacent spot in which to turn around. It is likely that the mobile unit 1 could turn around exactly where it is currently located. However, to be safe, the program searches for a nearby location that consists of a processed grid point surrounded by other processed grid points. The collection of nine processed grid points assures a processed area large enough for the mobile unit 1 to spin to face any direction. The large drive wheels 19 on the illustrated mobile unit 1 can rotate in opposite directions, so the mobile unit's 1 turning radius is very close to zero.

The second task the program tries to accomplish in the Feeder Reload state 136 is to identify the closest unprocessed grid point. The program can easily compare the distance to each of the remaining unprocessed grid points to determine which one is closest. Once it does so, it then calculates the movement vector that points toward that grid point.

The software guides the mobile unit 1 to the adjacent grid point where it can rotate and rotates it to face the next target. If the next target is not immediately adjacent to the mobile unit 1, the program will proceed toward that point using a straight-line algorithm that is similar to the centrifugal routing algorithm, and described below. Once the mobile unit 1 reaches the target point, the software returns 143 to the Centrifugal Routing state 137.

If the software calculates that there are no remaining unprocessed grid points in the given loop set, then the program knows that this loop set is completed. The program then hands control over 144 to the Path Tracking state 135 which will direct the mobile unit 1 in as straight a line as possible to the beginning of the connector path to the next loop set.

When the last loop set is complete, the mobile unit 1 can reset all of the grid points back to their unprocessed state and begin a new cycle. During the subsequent processing cycle, it does not need to travel the loop sets in the same order, but can instead process them in reverse order to minimize transit time. However, to keep the time interval between processing cycles fairly uniform across all of the loop sets, the mobile unit 1 should maintain the same loop set order during each processing cycle. At any time, the mobile unit 1 may need to return to the fixed station 2 to be recharged or when the scheduled work time period ends.

When the mobile unit 1 is attempting to travel in a straight line to either the closest unprocessed grid point or to the beginning of a desired connector path, it is likely to run into obstacles. The software handles these obstacles in much the same manner as it does when using the centrifugal routing algorithm. It looks two steps forward at the desirability of a set of path options. The centrifugal routing algorithm is looking for nines and favors the outcome that pushes it closer to the outside of the area to be worked. In contrast, the straight-line algorithm is looking for nines or fives and favors the outcome that keeps the movement vector most in line with that which points to the target grid point. In the Feeder Reload state 136, the destination point should be, by definition, the closest nine, so the software is not expecting to encounter a nine along the straight-line path. If it does, however, it will hand off control 143 to the Centrifugal Routing state 137 at that point. The straight-line algorithm has its own variation of the backout procedure. The software also changes the fives to sevens as it travels over the grid points, guaranteeing that it will not pass over the same grid point again. This technique helps to ensure that the mobile unit 1 does not become trapped in a circular path. When the mobile unit 1 reaches an acceptable destination, the program changes the sevens back to fives so that they do not interfere with any subsequent straight-line routing.

In each of the above discussions of the various operational states, the software makes use of the data provided by the user during programming to guide the movement of the mobile unit 1. The mobile unit 1 also needs to be prepared to adapt to objects that appear without notice. For a vegetation-cutting application, such objects might be tools, or toys left in the yard, fallen tree limbs, or spot flooding. In the illustrated embodiment, the software is regularly sending out ultrasonic, lidar, or radar pulses to the front and rear of the mobile unit 1. By examining the amplitude and phase of the reflected signals, the software can generate an image of items located a short distance in front of or behind the mobile unit 1. If the images depict an impending collision, the software can temporarily change the appropriate mapping grid points to zeros so that the routing algorithm will route the mobile unit 1 around the obstacle. If the obstacle is present on subsequent passes, the mobile unit 1 can send a message to the user informing her of the presence of a new obstacle.

This invention has many additional sensor inputs, discussed earlier in the text, that the software can use to help it avoid or detect collisions with obstacles. By integrating these sensor inputs with the user-programmed geolocation information, the invention described in this patent will exhibit a high level of artificial intelligence that will enable it to perform a variety of important tasks with a minimum of user oversight or maintenance.

I claim:

1. A multifunctional mobile appliance comprising a carriage, means for providing energy for said carriage, means for moving said carriage, receiver means for receiving satellite navigation signals adapted to control the movement of said carriage by said moving means, memory means for receiving and storing location information signals relative to an area over which said carriage is adapted to be moved, means for comparing the satellite navigation signals of said receiver means and the location information signals of said memory means and generating a carriage control signal therefrom, means for controlling the movement of said carriage in response to said carriage control signal to effect movement of said carriage by said moving means along the area, means for performing a task over the area during the movement of said carriage, means for controlling the operation of said task performing means, means for energy distribution, means for sensing the need for more energy to satisfy the requirements of said task performing means, said carriage movement controlling means being responsive to said sensing means for moving said carriage to said energy distribution means, means for transferring energy from said energy distribution means to said carriage energy providing means, and means for controlling the transfer of energy from said energy distribution means to said carriage energy providing means.

2. The multifunctional mobile appliance as defined in claim 1 wherein said receiver means includes RTK-GPS means for effecting precise movement of said carriage over said area.

3. The multifunctional mobile appliance as defined in claim 1 wherein said receiver means includes RTK-GPS means for effecting precise movement of said carriage over said area, and said RTK-GPS means includes means for receiving signals from GLONASS satellites.

4. The multifunctional mobile appliance as defined in claim 1 further comprising a fixed station, second receiver means at said fixed station for receiving satellite navigation signals, means at said fixed station for extracting error navigation signals from the received satellite navigation signals, means for transmitting the extracted error navigation signals to said carriage movement controlling means, and said carriage movement controlling means including means for correcting said carriage control signal based upon said error signal to thereby refine the accuracy of said carriage control signal prior to effecting the movement of said carriage thereby.

5. The multifunctional mobile appliance as defined in claim 1 further comprising a fixed station, second receiver means at said fixed station for receiving satellite navigation signals, said receiver means including RTK-GPS means for effecting precise movement of said carriage over said area, means at said fixed station for extracting error navigation signals from the received satellite navigation signals, means for transmitting the extracted error navigation signals to said carriage movement controlling means, and said carriage movement controlling means including means for correcting said carriage control signal based upon said error signal to thereby refine the accuracy of said carriage control signal prior to effecting the movement of said carriage thereby.

6. The multifunctional mobile appliance as defined in claim 1 further comprising a fixed station, second receiver means at said fixed station for receiving satellite navigation signals, said receiver means including RTK-GPS means for effecting precise movement of said carriage over said area, said RTK-GPS means including means for receiving signals from GLONASS satellites, means at said fixed station for extracting error navigation signals from the received satellite navigation signals, means for transmitting the extracted error navigation signals to said carriage movement controlling means, and said carriage movement controlling means including means for correcting said carriage control signal based upon said error signal to thereby refine the accuracy of said carriage control signal prior to effecting the movement of said carriage thereby.

7. The multifunctional mobile appliance as defined in claim 1 further comprising means for inertially navigating said carriage, and said carriage movement control means being responsive to said inertial navigating means.

8. The multifunctional mobile appliance as defined in claim 1 further comprising means for remotely controlling said carriage movement controlling means and said task controlling means.

9. The multifunctional mobile appliance as defined in claim 1 wherein said means for providing energy includes converting sunlight into electrical energy.

10. The multifunctional mobile appliance as defined in claim 1 wherein said means for providing energy includes a battery.

11. The multifunctional mobile appliance as defined in claim 1 wherein said energy transferring means includes one of inductive coupling and conductive coupling.

12. The multifunctional mobile appliance as defined in claim 1 wherein said energy distribution means includes a public power utility.

13. The multifunctional mobile appliance as defined in claim 1 wherein said location information signals stored in said memory means include data defining at least one perimeter of the area over which the carriage is adapted to be moved.

14. The multifunctional mobile appliance as defined in claim 1 wherein said task performing means extends outside of at least one side of said carriage for performing the task thereof substantially at a perimeter of the area over which the carriage is adapted to be moved.

15. The multifunctional mobile appliance as defined in claim 1 wherein said task performing means includes means for moving said task performing means in response to one of striking an obstacle and overloading of said task performing means.

16. The multifunctional mobile appliance as defined in claim 1 wherein said task performing means is a mower.

17. The multifunctional mobile appliance as defined in claim 1 wherein
said task performing means is one of a vacuum, a sander, and a polisher.

18. The multifunctional mobile appliance as defined in claim 1 wherein
said moving means includes two independently driven wheels and a pivoting wheel.

19. The multifunctional mobile appliance as defined in claim 1 wherein
said moving means includes a stepper motor.

20. The multifunctional mobile appliance as defined in claim 1 wherein
said task performing means includes a brushless DC motor.

21. A multifunctional mobile appliance comprising
a carriage,
means for providing energy for said carriage,
means for moving said carriage,
receiver means for receiving satellite navigation signals adapted to control the movement of said carriage by said moving means,
memory means for receiving and storing location information signals relative to an area over which said carriage is adapted to be moved,
means for comparing the satellite navigation signals of said receiver means and the location information signals of said memory means and generating a carriage control signal therefrom,
means for controlling the movement of said carriage in response to said carriage control signal to effect movement of said carriage by said moving means along the area,
means for performing a task over the area during the movement of said carriage,
means for controlling the operation of said task performing means,
means for inertially navigating said carriage,
said inertial navigating means including one of a wheel rotation encoder and an accelerometer, and
said carriage movement control means being responsive to said inertial navigating means.

22. A multifunctional mobile appliance comprising
a carriage,
means for providing energy for said carriage,
means for moving said carriage,
receiver means for receiving satellite navigation signals adapted to control the movement of said carriage by said moving means,
memory means for receiving and storing location information signals relative to an area over which said carriage is adapted to be moved,
means for comparing the satellite navigation signals of said receiver means and the location information signals of said memory means and generating a carriage control signal therefrom,
means for controlling the movement of said carriage in response to said carriage control signal to effect movement of said carriage by said moving means along the area,
means for performing a task over the area during the movement of said carriage,
means for controlling the operation of said task performing means,
means for inertially navigating said carriage,
said inertial navigating means including one of a gyroscope and a magnetometer, and
said carriage movement control means being responsive to said inertial navigating means.

23. A multifunctional mobile appliance comprising
a carriage,
means for providing energy for said carriage,
means for moving said carriage,
receiver means for receiving satellite navigation signals adapted to control the movement of said carriage by said moving means,
memory means for receiving and storing location information signals relative to an area over which said carriage is adapted to be moved,
means for comparing the satellite navigation signals of said receiver means and the location information signals of said memory means and generating a carriage control signal therefrom,
means for controlling the movement of said carriage in response to said carriage control signal to effect movement of said carriage by said moving means along the area,
means for performing a task over the area during the movement of said carriage,
means for controlling the operation of said task performing means,
means for detecting less than optimal operating conditions within the area over which the carriage is adapted to be moved, and
means for adapting the movement of said carriage toward minimizing the degradation in performance caused by said less than optimal conditions.

24. The multifunctional mobile appliance as defined in claim 23 wherein
said detecting means including one of an ultrasonic transducer, a radar means, and a lidar means.

25. The multifunctional mobile appliance as defined in claim 23 wherein
said detecting means including image-processing software and one of a visible imaging means and an infrared imaging means.

26. The multifunctional mobile appliance as defined in claim 23 wherein
said detecting means including one of an inductive transducer, a capacitive transducer, and a wheel rotation sensor.

27. A multifunctional mobile appliance comprising
a carriage,
means for providing energy for said carriage,
means for moving said carriage,
receiver means for receiving satellite navigation signals adapted to control the movement of said carriage by said moving means,
memory means for receiving and storing location information signals relative to an area over which said carriage is adapted to be moved,
means for comparing the satellite navigation signals of said receiver means and the location information signals of said memory means and generating a carriage control signal therefrom,
means for controlling the movement of said carriage in response to said carriage control signal to effect movement of said carriage by said moving means along the area, means for performing a task over the area during the movement of said carriage, means for controlling the operation of said task performing means, means for remotely controlling said carriage movement controlling means and said task controlling means, and said remotely controlling means is responsive to one of spread-spectrum signals and frequency-hopping signals.

28. A multifunctional mobile appliance comprising a carriage, means for providing energy for said carriage, means for moving said carriage, receiver means for receiving satellite navigation signals adapted to control the movement of said carriage by said moving means, memory means for receiving and storing location information signals relative to an area over which said carriage is adapted to be moved, means for comparing the satellite navigation signals of said receiver means and the location information signals of said memory means and generating a carriage control signal therefrom, means for controlling the movement of said carriage in response to said carriage control signal to effect movement of said carriage by said moving means along the area, means for performing a task over the area during the movement of said carriage, means for controlling the operation of said task performing means, means for remotely controlling said carriage movement controlling means and said task controlling means, and said remotely controlling means is responsive to signals carried over public utilities.

29. The multifunctional mobile appliance as defined in claim 28 wherein said public utilities include one of the Internet and the World Wide Web.

30. A multifunctional mobile appliance comprising a carriage, means for providing energy for said carriage, means for moving said carriage, receiver means for receiving satellite navigation signals adapted to control the movement of said carriage by said moving means, memory means for receiving and storing location information signals relative to an area over which said carriage is adapted to be moved, means for comparing the satellite navigation signals of said receiver means and the location information signals of said memory means and generating a carriage control signal therefrom, means for controlling the movement of said carriage in response to said carriage control signal to effect movement of said carriage by said moving means along the area, means for performing a task over the area during the movement of said carriage, means for controlling the operation of said task performing means, means for dispensing material, means for sensing the need for additional material to satisfy the requirements of said task performing means, said carriage movement controlling means being responsive to said sensing means for moving said carriage to said material dispensing means, means for transferring the material from said material dispensing means to said carriage task performing means, and said task controlling means being responsive to said sensing means for the collection of material from said material dispensing means.

31. A multifunctional mobile appliance comprising a carriage, means for providing energy for said carriage, means for moving said carriage, receiver means for receiving satellite navigation signals adapted to control the movement of said carriage by said moving means, memory means for receiving and storing location information signals relative to an area over which said carriage is adapted to be moved, means for comparing the satellite navigation signals of said receiver means and the location information signals of said memory means and generating a carriage control signal therefrom, means for controlling the movement of said carriage in response to said carriage control signal to effect movement of said carriage by said moving means along the area, means for performing a task over the area during the movement of said carriage, means for controlling the operation of said task performing means, means for collecting waste, means for sensing the need for the removal of waste from said carriage to satisfy the requirements of said task performing means, said carriage movement controlling means being responsive to said sensing means for moving said carriage to said waste collecting means, means for transferring the waste from said carriage to said waste collecting means, and said task controlling means being responsive to said sensing means for the discharge of the waste into said waste collecting means.

32. A multifunctional mobile appliance comprising a carriage, means for providing energy for said carriage, means for moving said carriage, receiver means for receiving satellite navigation signals adapted to control the movement of said carriage by said moving means, memory means for receiving and storing location information signals relative to an area over which said carriage is adapted to be moved, means for comparing the satellite navigation signals of said receiver means and the location information signals of said memory means and generating a carriage control signal therefrom, means for controlling the movement of said carriage in response to said carriage control signal to effect movement of said carriage by said moving means along the area, means for performing a task over the area during the movement of said carriage, means for controlling the operation of said task performing means, means for teaching said movement controlling means said location information signals, and said teaching means including one of a membrane switch and speech generation for a user interface.

33. The multifunctional mobile appliance as defined in claim 32 wherein said location information signals include data defining at least one perimeter of said area over which the carriage is adapted to be moved.

34. The multifunctional mobile appliance as defined in claim 32 wherein said location information signals include data defining at least one perimeter of said area over which the carriage is adapted to be moved taught by said teaching means in the absence of physically guiding said carriage relative to said perimeter.

35. The multifunctional mobile appliance as defined in claim 32 wherein said location information signals include data defining at least one perimeter of said area over which the carriage is adapted to be moved taught by said teaching means through the physical guiding of said carriage relative to said perimeter.

36. A multifunctional mobile appliance comprising a carriage, means for providing energy for said carriage, means for moving said carriage, receiver means for receiving satellite navigation signals adapted to control the movement of said carriage by said moving means, memory means for receiving and storing location information signals relative to an area over which said carriage is adapted to be moved, means for comparing the satellite navigation signals of said receiver means and the location information signals of said memory means and generating a carriage control signal therefrom, means for controlling the movement of said carriage in response to said carriage control signal to effect movement of said carriage by said moving means along the area, means for performing a task over the area during the movement of said carriage, means for controlling the operation of said task performing means, second means for performing a second task differing from the first task over the area during movement of said carriage, and means for effecting selective operation of said first and second task performing means.

37. A multifunctional mobile appliance comprising a carriage, means for providing energy for said carriage, means for moving said carriage, receiver means for receiving satellite navigation signals adapted to control the movement of said carriage by said moving means, memory means for receiving and storing location information signals relative to an area over which said carriage is adapted to be moved, means for comparing the satellite navigation signals of said receiver means and the location information signals of said memory means and generating a carriage control signal therefrom, means for controlling the movement of said carriage in response to said carriage control signal to effect movement of said carriage by said moving means along the area, means for performing a task over the area during the movement of said carriage, means for controlling the operation of said task performing means, second means for performing a second task differing from the first task over the area during movement of said carriage, and means for automating the substitution of one of said task performing means for another of said task performing means.

38. A multifunctional mobile appliance comprising a carriage, means for providing energy for said carriage, means for moving said carriage, receiver means for receiving satellite navigation signals adapted to control the movement of said carriage by said moving means, memory means for receiving and storing location information signals relative to an area over which said carriage is adapted to be moved, means for comparing the satellite navigation signals of said receiver means and the location information signals of said memory means and generating a carriage control signal therefrom, means for controlling the movement of said carriage in response to said carriage control signal to effect movement of said carriage by said moving means along the area, means for performing a task over the area during the movement of said carriage, means for controlling the operation of said task performing means, said task controlling means being responsive to information provided by one of a user and a user support service toward varying one of the quantity and quality of the task performed by said task performing means in different portions of the area over which work is adapted to be performed.

39. A multifunctional mobile appliance comprising a carriage, means for providing energy for said carriage, means for moving said carriage, receiver means for receiving satellite navigation signals adapted to control the movement of said carriage by said moving means, memory means for receiving and storing location information signals relative to an area over which said carriage is adapted to be moved, means for comparing the satellite navigation signals of said receiver means and the location information signals of said memory means and generating a carriage control signal therefrom, means for controlling the movement of said carriage in response to said carriage control signal to effect movement of said carriage by said moving means along the area, means for performing a task over the area during the movement of said carriage, said task performing means including
a rotating blade assembly,
filtration means surrounding said blade assembly,
said filtration means preventing contact between said blade assembly and objects whose dimensions are substantially equal to the diameter of a finger, and
means for controlling the operation of said task performing means.

40. The multifunctional mobile appliance as defined in claim 39 wherein
said filtration means includes thin, closely-spaced, substantially vertical members of stiff but resilient material.

41. The multifunctional mobile appliance as defined in claim 39 wherein
said blade assembly rotates around a horizontal axis, and
said filtration means includes thin, closely-spaced, substantially vertical members of stiff but resilient material.

42. The multifunctional mobile appliance as defined in claim 39 wherein
said filtration means includes thin, closely-spaced, substantially vertical members of stiff but resilient material, and
said blade assembly includes blades uniformly mounted around a rotating central shaft thereby generating a substantially cylindrical cutting surface.

43. The multifunctional mobile appliance as defined in claim 39 wherein
said filtration means includes thin, closely-spaced, substantially vertical members of stiff but resilient material, and
said rotating blade assembly includes one of blades and abrasive materials mounted on a leading substantially helical edge thereby generating a cylindrical cutting surface.

44. A method of controlling a mobile appliance comprising the steps of
receiving satellite navigation signals adapted to control the movement of the mobile appliance,
receiving and storing location information signals relative to an area inside a building over which the mobile appliance is adapted to be moved,
comparing said satellite navigation signals and said location information signals and generating a mobile appliance control signal therefrom,
controlling the movement of the mobile appliance in response to said mobile appliance control signal to effect movement of the mobile appliance along said area, and
controlling the performance of a task over said area during the movement of said mobile appliance.

45. The method as defined in claim 44 further comprising the step of
comparing the received satellite navigation signals with inertial navigation information toward enabling the selection of the best satellite navigation signals from a plurality of received satellite navigation signals to thereby refine the accuracy of said mobile appliance control signal prior to effecting the movement of the mobile appliance thereby.

46. The method as defined in claim 44 further comprising the steps of
receiving satellite navigation signals at a fixed reference location,
extracting error navigation signals from the received satellite navigation signals,
transmitting the extracted error navigation signals to the mobile appliance, and
correcting said mobile appliance control signal based upon said error signal to thereby refine the accuracy of said mobile appliance control signal prior to effecting the movement of the mobile appliance thereby.

47. The method as defined in claim 44 further comprising the steps of
receiving satellite navigation signals at a fixed reference location,
processing said received navigation signals using RTK-GPS algorithms for effecting precise movement of the mobile appliance over said area,
extracting error navigation signals from the received satellite navigation signals,
transmitting the extracted error navigation signals to the mobile appliance, and
correcting said mobile appliance control signal based upon said error signal to thereby refine the accuracy of said mobile appliance control signal prior to effecting the movement of the mobile appliance thereby.

48. The method as defined in claim 44 further comprising the step of receiving said satellite navigation signals through a choke ring antenna toward enabling the elimination of signal multipath.

49. The method as defined in claim 44 further comprising the step of filtering out multipath from said satellite navigation signals through the application of digital signal processing algorithms.

50. The method as defined in claim 44 further comprising the step of passing said satellite navigation signals through automatic gain control circuitry toward compensating for building structure signal attenuation.

* * * * *